(12) United States Patent
Bucheru

(10) Patent No.: US 11,142,308 B2
(45) Date of Patent: Oct. 12, 2021

(54) SEMI-OPEN FLUID JET VTOL AIRCRAFT

(71) Applicant: Bogdan Tudor Bucheru, San Jose, CA (US)

(72) Inventor: Bogdan Tudor Bucheru, San Jose, CA (US)

( * ) Notice: Subject to any disclaimer, the term of this patent is extended or adjusted under 35 U.S.C. 154(b) by 0 days.

(21) Appl. No.: 16/718,569

(22) Filed: Dec. 18, 2019

(65) Prior Publication Data

US 2020/0207468 A1 Jul. 2, 2020

(51) Int. Cl.
*B64C 29/00* (2006.01)
*B64C 9/04* (2006.01)
*B64D 27/02* (2006.01)

(52) U.S. Cl.
CPC ............ *B64C 29/0016* (2013.01); *B64C 9/04* (2013.01); *B64D 27/02* (2013.01)

(58) Field of Classification Search
CPC . B64C 29/00; B64C 29/0008; B64C 29/0016; B64C 29/0033
See application file for complete search history.

(56) References Cited

U.S. PATENT DOCUMENTS

| | | | | |
|---|---|---|---|---|
| 3,082,977 A * | 3/1963 | Arlin | ................... | B64C 29/0025 244/17.23 |
| 3,184,183 A * | 5/1965 | Plasecki | ................... | B64C 27/20 244/23 R |
| 6,464,166 B1 * | 10/2002 | Yoeli | ....................... | B64C 27/20 244/12.1 |
| 6,619,220 B1 * | 9/2003 | Ducote | ..................... | B60V 1/02 114/67 A |
| 7,249,732 B2 * | 7/2007 | Sanders, Jr. | ............ | B64C 27/12 244/12.1 |
| 7,717,368 B2 * | 5/2010 | Yoeli | ....................... | B64C 27/20 244/23 D |
| 7,857,253 B2 * | 12/2010 | Yoeli | ........................ | B64C 1/22 244/12.3 |
| 8,496,200 B2 * | 7/2013 | Yoeli | ................... | B64C 29/0025 244/23 B |
| 9,156,549 B2 * | 10/2015 | Vetters | ................ | B64C 29/0025 |
| 2003/0038213 A1 * | 2/2003 | Yoeli | ...................... | B64C 11/001 244/50 |
| 2004/0104303 A1 * | 6/2004 | Mao | ........................ | B64C 37/00 244/12.5 |
| 2009/0159757 A1 * | 6/2009 | Yoeli | ........................ | B60V 3/08 244/23 A |
| 2010/0051753 A1 * | 3/2010 | Yoeli | ................... | B64C 29/0025 244/23 A |
| 2011/0192931 A1 * | 8/2011 | Jung | ........................ | B64C 37/00 244/2 |
| 2013/0026304 A1 * | 1/2013 | Wang | ................... | B64C 29/0033 244/7 R |
| 2013/0112804 A1 * | 5/2013 | Zhu | ........................... | B64C 3/56 244/2 |
| 2014/0103158 A1 * | 4/2014 | Berry | ................... | B64C 29/0033 244/2 |
| 2014/0124613 A1 * | 5/2014 | Yang | ....................... | B64C 37/00 244/12.4 |

(Continued)

*Primary Examiner* — Michael H Wang
(74) *Attorney, Agent, or Firm* — Pierson IP, PLLC

(57) ABSTRACT

A wingless compact aircraft, with limited footprint and no exposed high-speed moving parts. The aircraft can takeoff and land vertically, can fly at high-speed and even cruise on land and water in one of the preferred embodiments.

13 Claims, 27 Drawing Sheets

(56) References Cited

U.S. PATENT DOCUMENTS

| | | | |
|---|---|---|---|
| 2014/0158816 A1* | 6/2014 | DeLorean | B64C 27/32 244/12.4 |
| 2015/0274289 A1* | 10/2015 | Newman | B64C 29/0025 244/12.4 |
| 2016/0311529 A1* | 10/2016 | Brotherton-Ratcliffe | B64D 35/06 |
| 2017/0036760 A1* | 2/2017 | Stan | B64C 29/0033 |
| 2017/0217588 A1* | 8/2017 | Spinelli | G08G 5/0069 |
| 2018/0201369 A1* | 7/2018 | Johnson | B64C 11/001 |
| 2018/0222580 A1* | 8/2018 | DeLorean | B64D 27/24 |
| 2018/0257772 A1* | 9/2018 | Bernhardt | B64C 35/00 |
| 2018/0354607 A1* | 12/2018 | Marot | F16M 11/18 |
| 2020/0010209 A1* | 1/2020 | Bender | F28F 21/02 |
| 2020/0130825 A1* | 4/2020 | Muthukumar | B64C 3/56 |

* cited by examiner

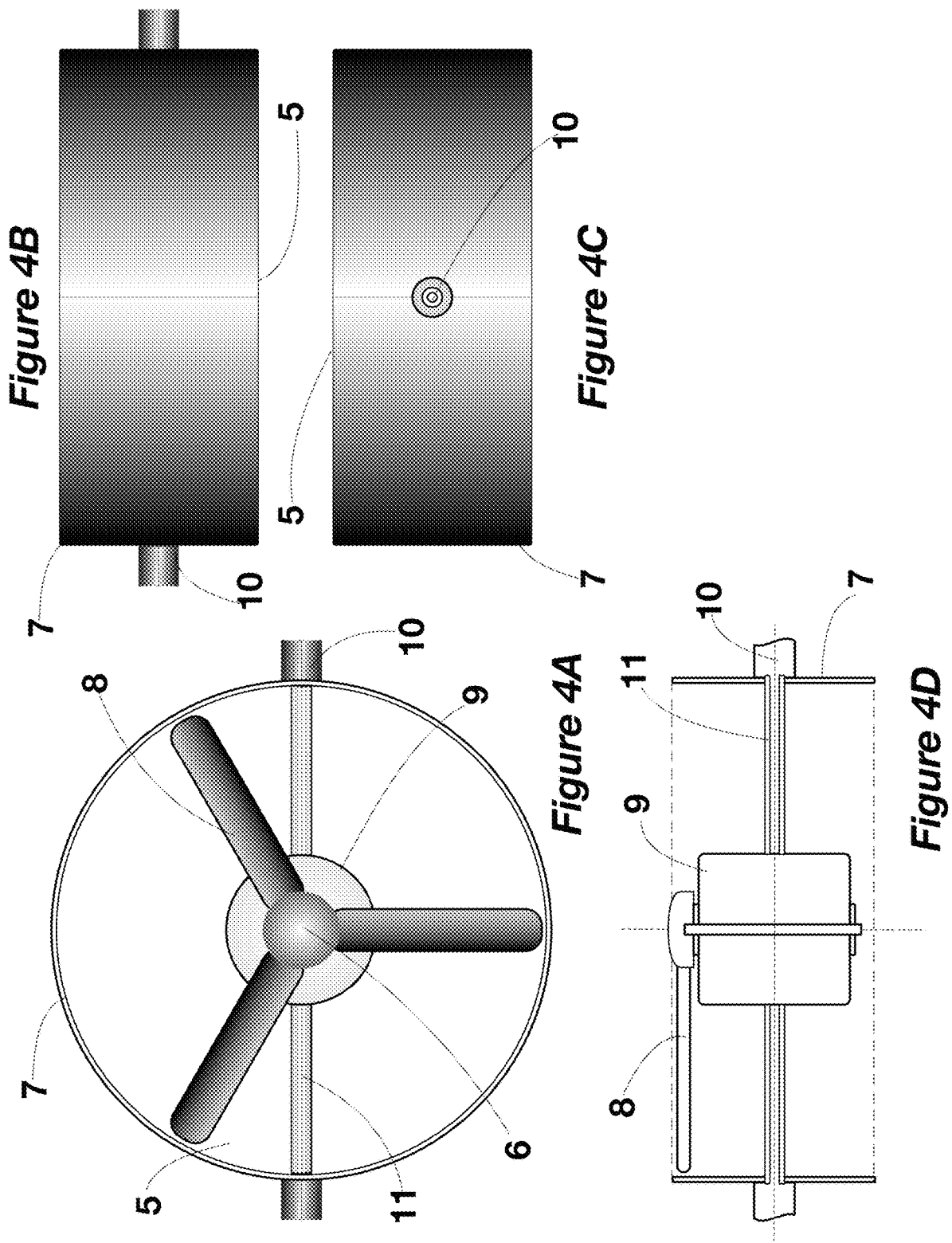

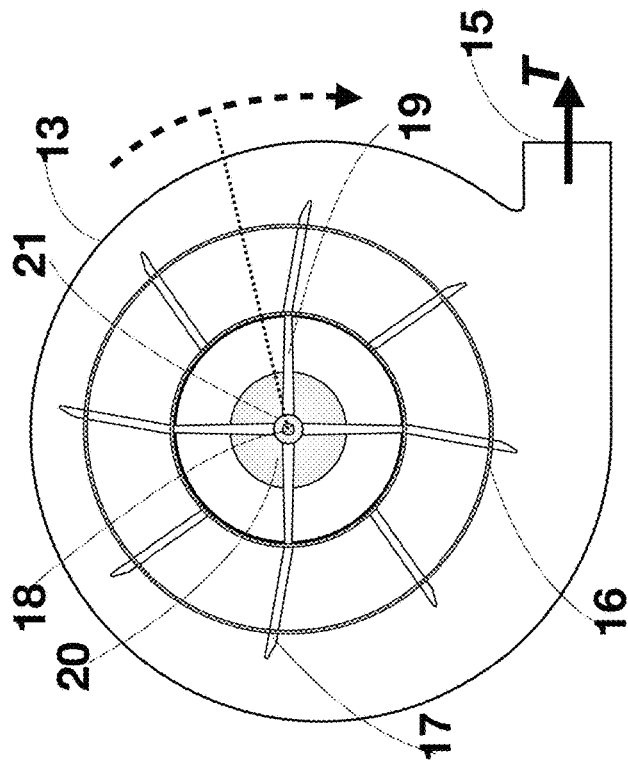
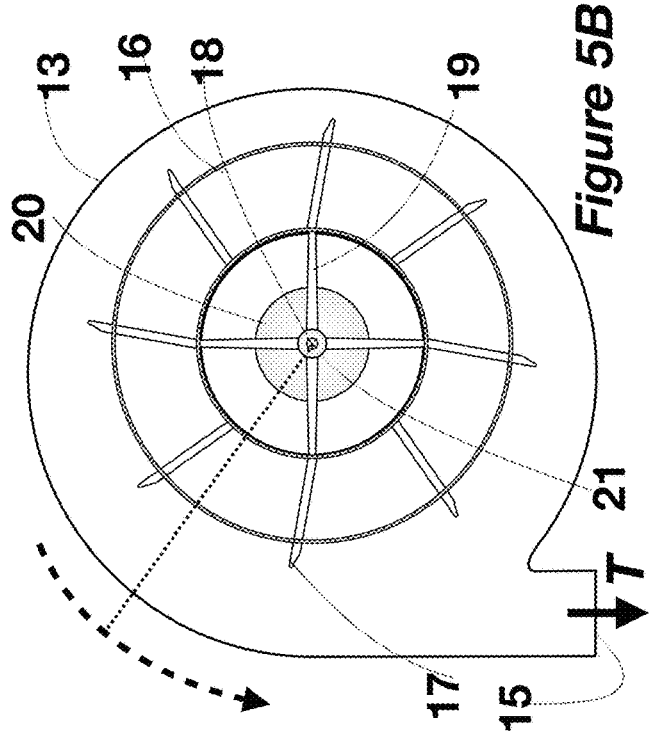
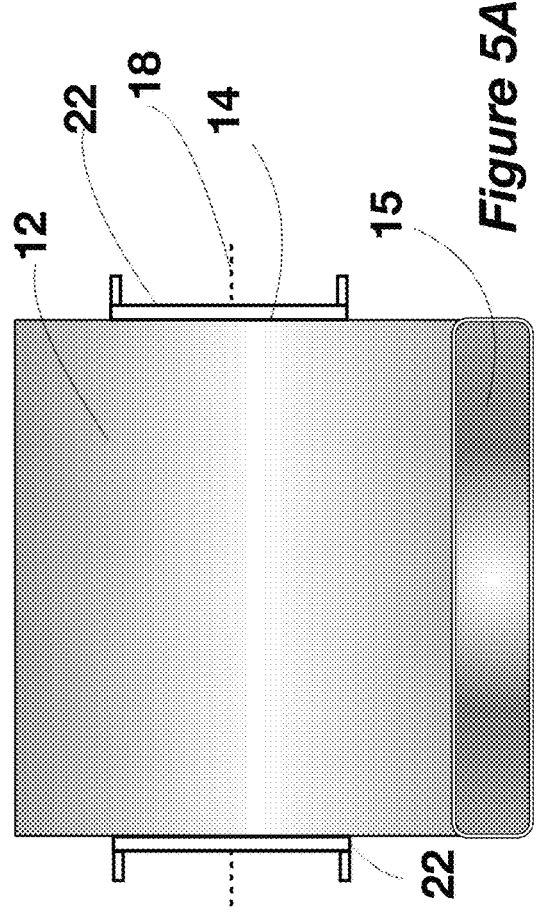
Figure 5C
Figure 5B
Figure 5A

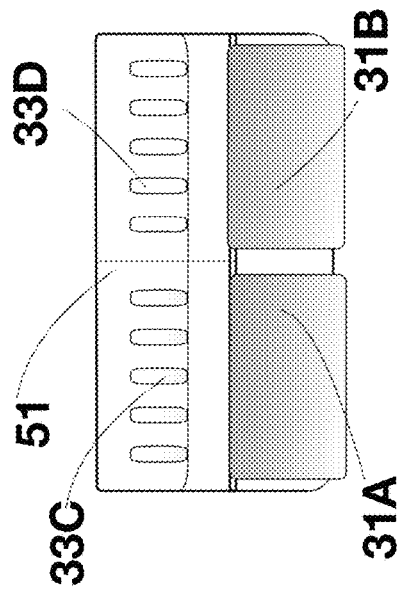
*Figure 6A*
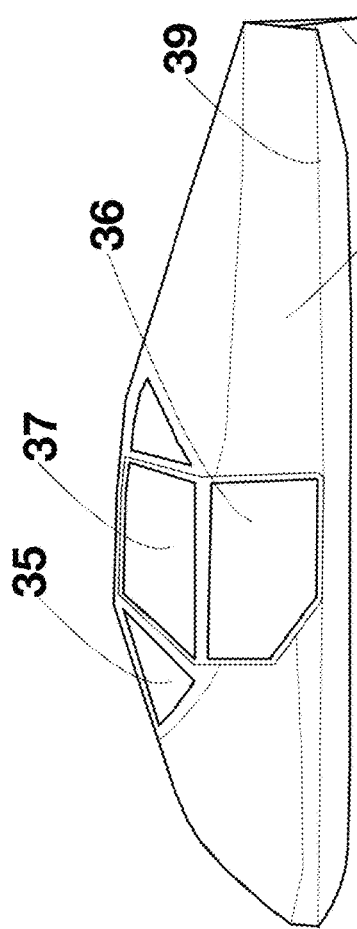
*Figure 6C*
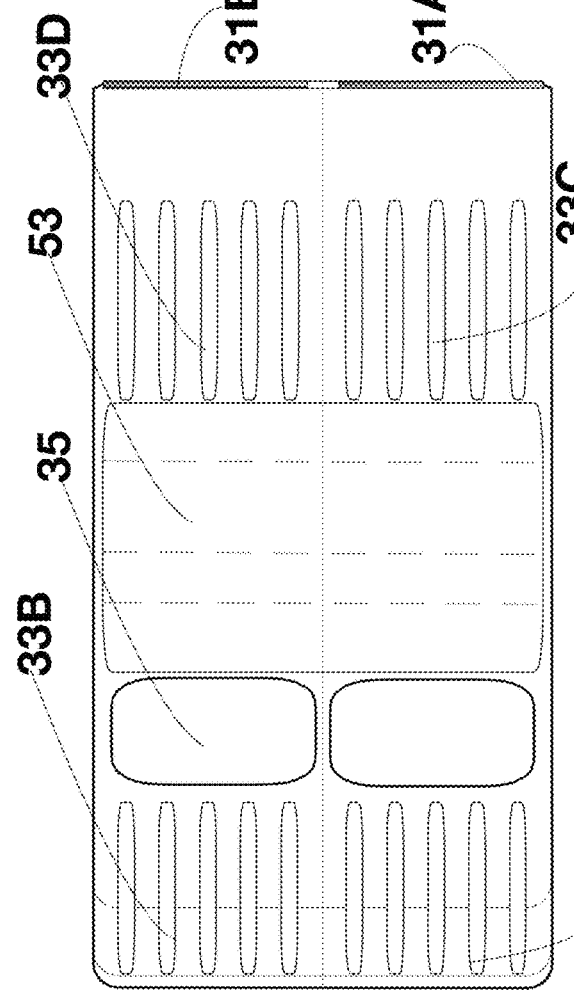
*Figure 6B*
*Figure 6D*

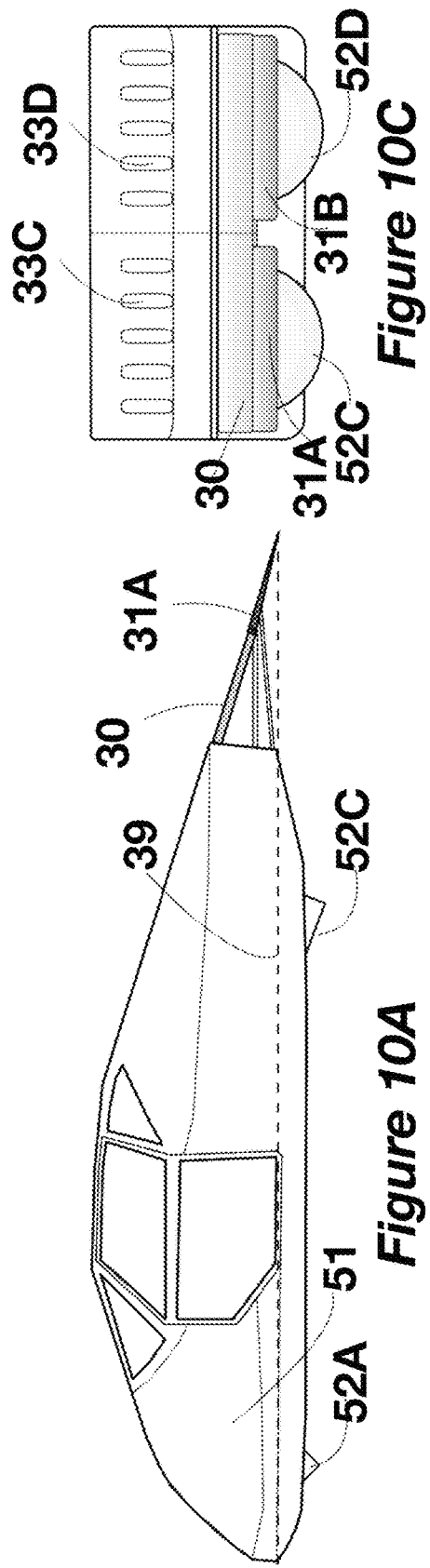
Figure 10A
Figure 10C
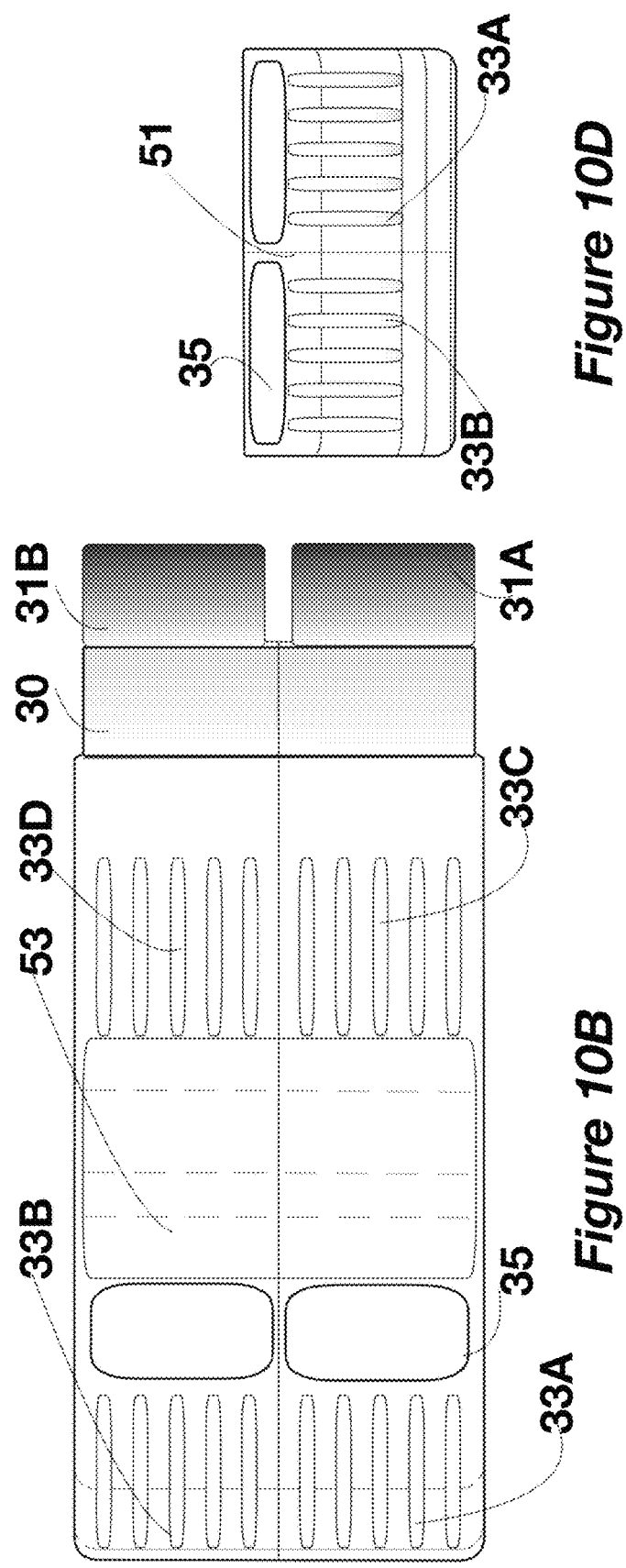
Figure 10B
Figure 10D

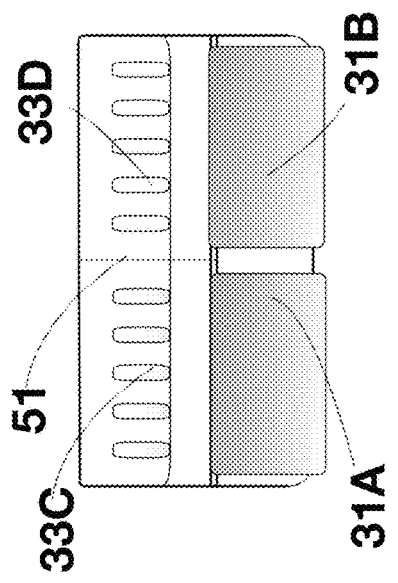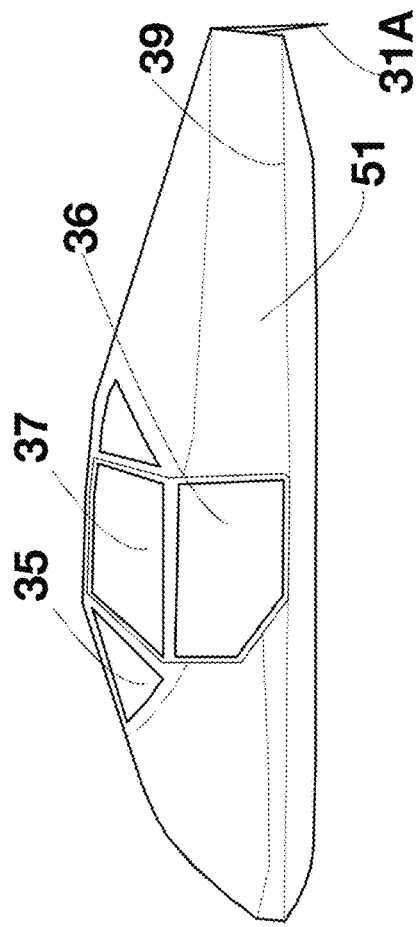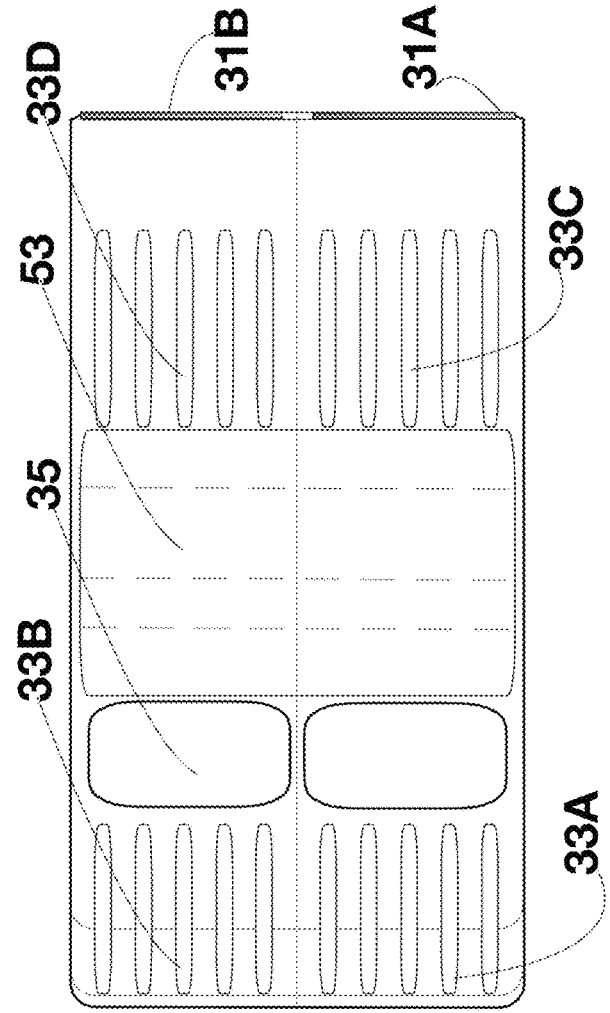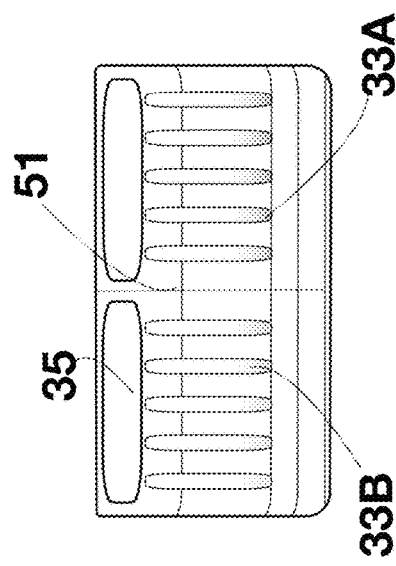

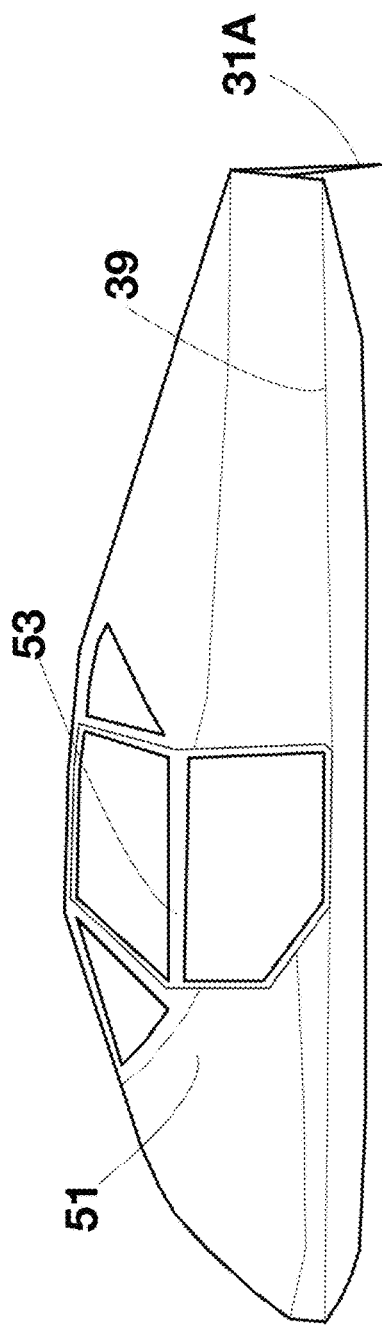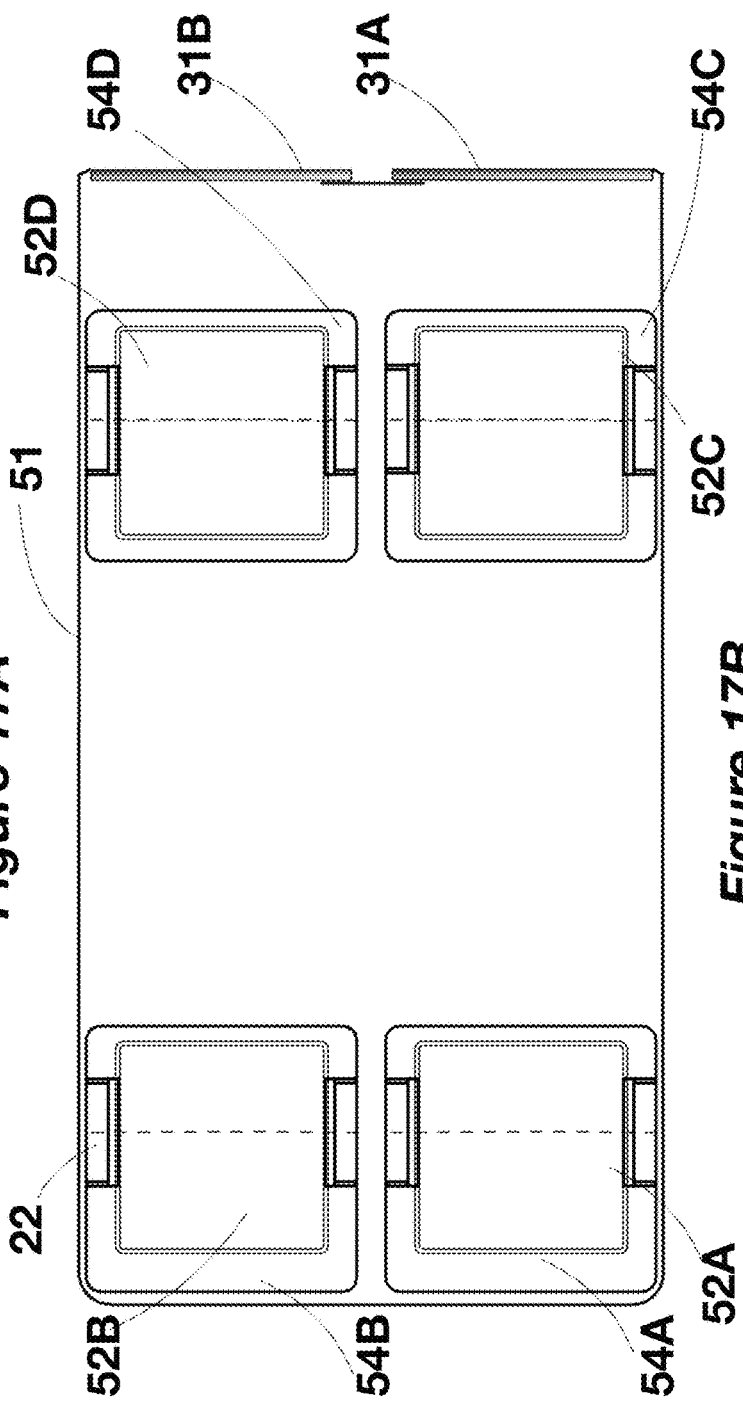

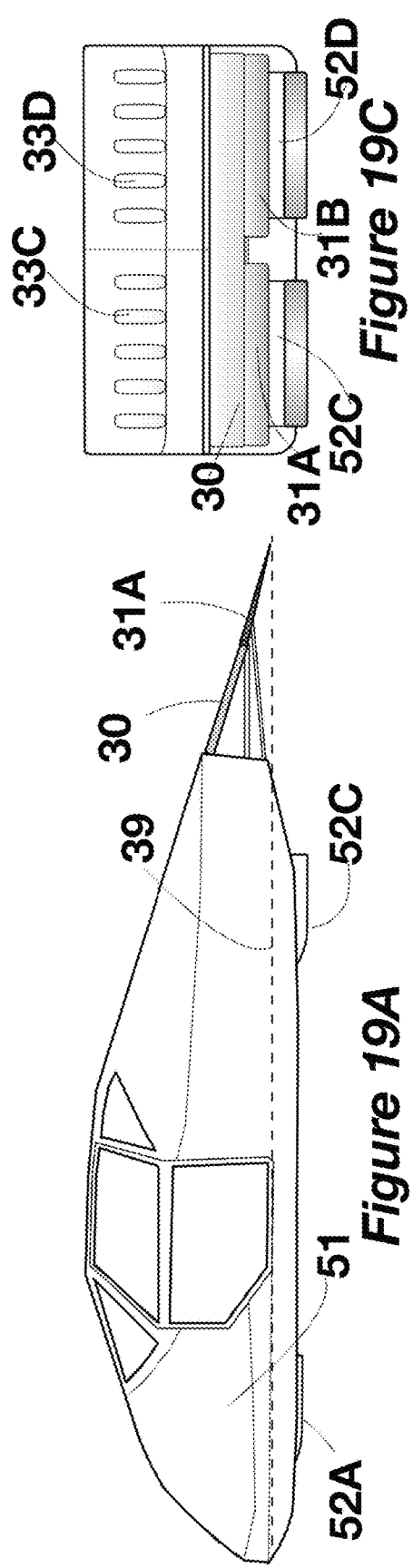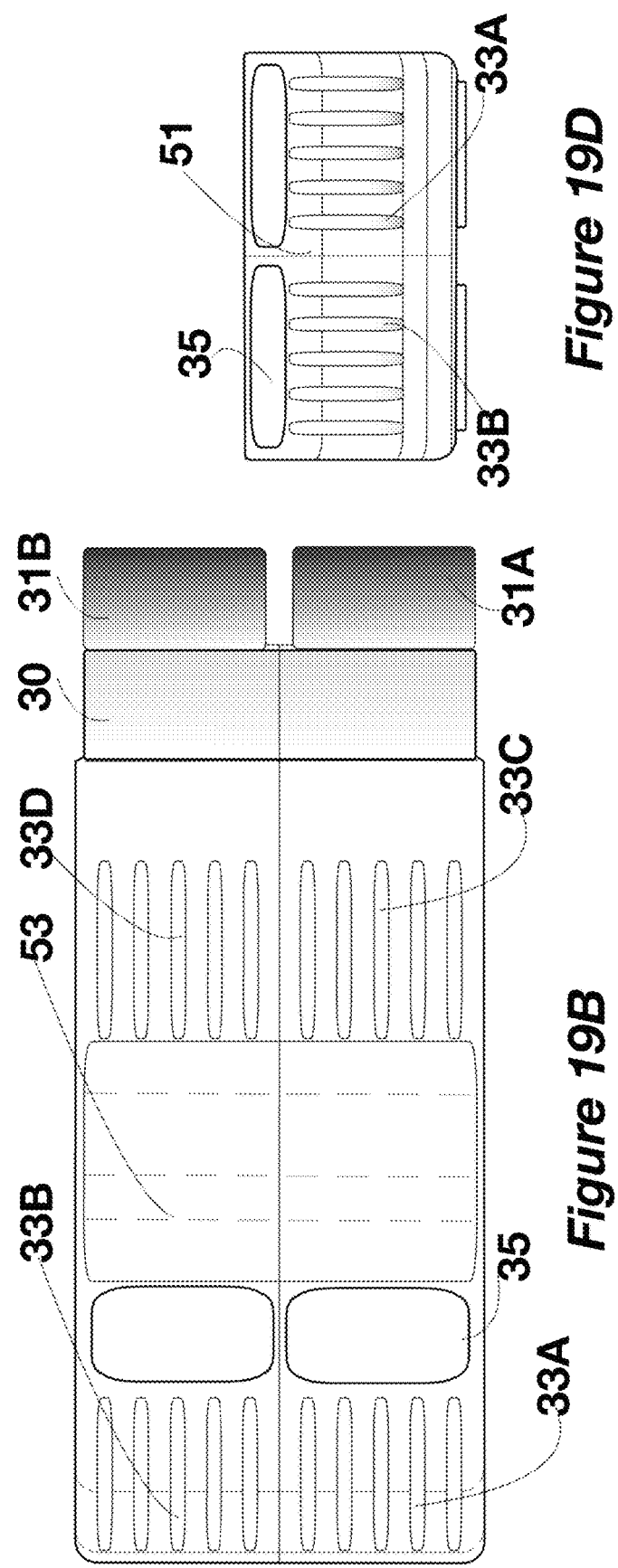

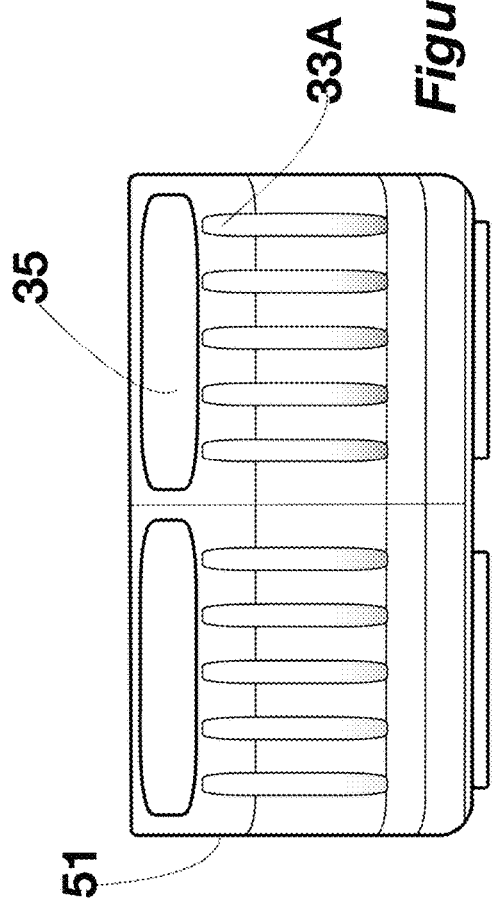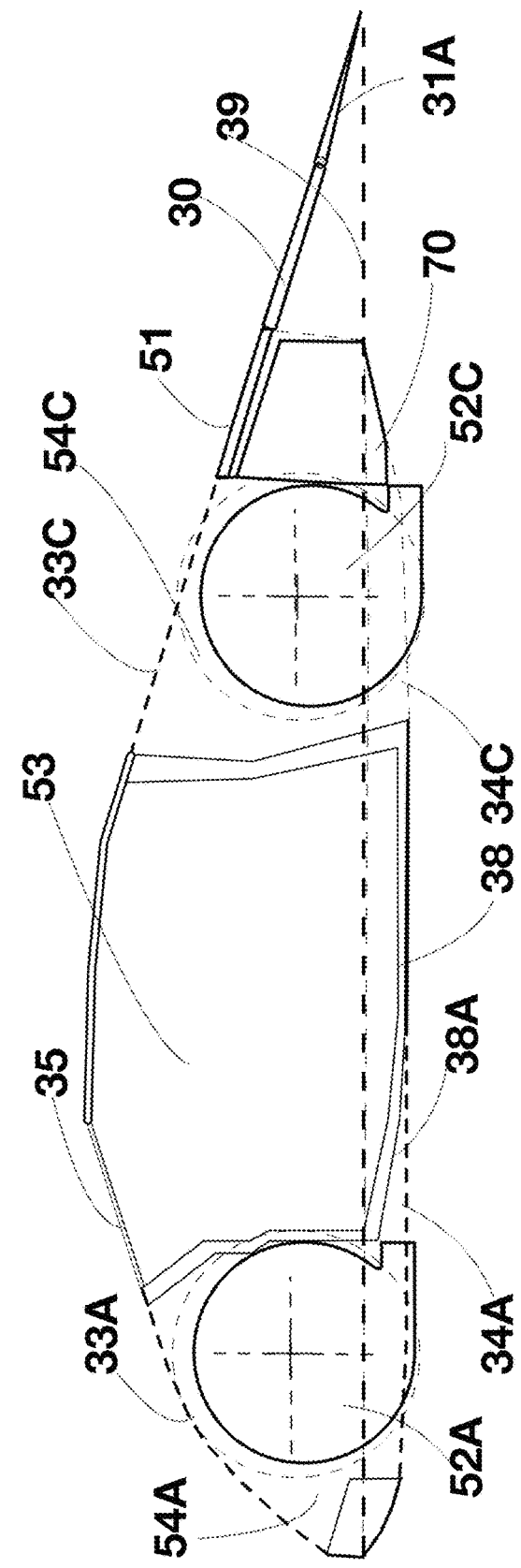

SEMI-OPEN FLUID JET VTOL AIRCRAFT

FIELD OF THE INVENTION

This invention relates to flying method and apparatus for devices heavier than air and capable of vertical takeoff and landing (VTOL), with extended application to any kind of fluid (e.g. water), by using a controlled fluid flow around and inside of a wing-shaped body.

BACKGROUND OF THE INVENTION

The system of flowing gases on an open surface for producing vertical thrust has been used in the past for generating lift or enhancing the lift produced by wings.

In a more general idea, the main physical phenomena used to create lift are conservation of momentum (CM), Bernoulli law (BL), Coandă effect (CE) and ground effect (GE).

The main flying methods used or proposed in the past can be classified in five categories: rockets (a) that are based on (CM); airplanes or winged devices (b) that are in popular references based on (BL) for lift, although more accurate explanations prefer the vorticity (CM) as the cause of the lift over the Bernoulli effect; helicopters (c) that use primarily (CM); hovercrafts and lift platforms (d) that use (GE) as the main lift source; open lifting surface aircrafts (e) that use (BL) and (CE) for achieving lift.

While rockets are suitable mostly for one-time flight, with mainly military and space applications, airplanes and helicopters have become popular transportations means; however there are several drawbacks that have kept them from becoming more universally accessible, e.g. in a car-like manner.

Both airplanes and helicopters necessitate highly trained pilots and have big footprint in comparison with the useful cabin space—big wings and tail for airplanes, big propeller and boom tail for helicopters. Both airplanes and helicopters have high speed moving exposed propeller blades, and in some cases high speed hot gas jets when jet engines are used. In the case of airplanes a long takeoff run is necessary, bringing the need for well built and maintained airports.

Hovercrafts have had some commercial success in the latest decades, from military applications to toys; while their shape and footprint are much closer to those of a car, they are still lacking the flexibility and the commercial accessibility of the car and the risk of exposed propellers is still present.

Some open surface aircrafts have been proposed in the past and some recently RC (radio controlled) prototype level demonstrations have been made; while the footprint is compact and the exposure to high speed moving parts is reduced, the maneuverability is also reduced and the available payload room is small; furthermore, the shape of these aircrafts is circular, flying saucer like, not practical.

In conclusion, a compact shaped aircraft is the subject of this invention, with VTOL capability and with maximized payload room, easy to control by ordinary skilled people. All these are achieved without any exposed high speed moving parts and with reduced energy consumption.

PRIOR ART

Most of the known flying methods are a combinations of one or more of the physical phenomena (CM), (BL), (CE) and (GE), resulting in aircrafts that combine one or more of the (a), (b), (c), (d) and (e) solutions. FIG. 1 presents the main concept of an airplane, where a wing 1A is attached to a body 1B that is moved by a propeller 1C. The propeller needs to continually accelerate a huge mass of air in order to exert enough thrust for maintaining the speed V of the airplane, speed that is needed to create lift across the wing 1A.

Considering vorticity (CM) as the source of the wing lift, the airplane speed is used for creating the lift across the wing, as a fraction of the used energy creates a down-push D of the surrounding air, down-push that is balanced by an up-push of the wing, which generates the lift L. Increasing the lift of the wing is a complicated engineering work, because the drag force DF of the wing increases at the same time with the lift force of the wing. Hence an optimum combination between high airplane speed and wing profile and surface is necessary for flying, condition that varies a lot during takeoff, landing and cruising.

An enhancement of the traditional airplane wing lifting capability can be achieved based on (BL) and (CE) by controlling the fluid flow on the top of the wing, as proposed in U.S. Pat. Nos. 4,447,028, 6,926,229 and 7,823,840. Following this hybrid concept, a more active solution is proposed in U.S. Pat. No. 6,375,117, where horizontal flying and VTOL capability are proposed.

The helicopter propeller is producing vertical thrust L (lift) in the same way the airplane propeller is producing horizontal thrust. FIG. 2 shows the main concept of a helicopter, were the propeller 2A is providing lift (L) to the body 2B by applying a down trust (D) to the air, as conservation of momentum (CM) states. The stability of the aircraft requires a counter-momentum tail propeller 2C, and variable pitch blades for propeller 2A when moving horizontally, which brings limitation at high speed.

Multi-propeller helicopters have proved increased stability and maneuverability, the four-propeller concept being proposed in U.S. Pat. No. 3,873,049 and a variation in the more recent U.S. Pat. No. 7,857,253, where the ducted fans reduce the risk of injury due to fast moving blades. The advancement in battery technologies and digital control has made the RC aircrafts of four-propeller helicopter type (also known as quad-copter) a popular toy and a practical drone for commercial applications. The big footprint and the danger of exposed high speed moving blades limit their applicability for transport of persons.

Reducing the risk of exposed propeller and improving the high speed capability of the helicopters have led to the enclosed propeller approach as proposed in U.S. Pat. Nos. 5,064,143 and 6,834,829, while U.S. Pat. No. 6,050,520 replaces the propeller with a ducted fun. The resulting aircrafts are shaped more like a flying saucer and fail to reduce the footprint of the aircraft.

Combinations of circular wings and helicopter propeller or fan have been proposed in U.S. Pat. Nos. 5,503,351 and 6,450,446, both with VTOL capability but still having big footprint and exposed fast moving parts.

A hybrid combination of helicopter-like operation for takeoff and landing and an airplane cruising operation at high-speed has been proposed in mid 1960s by X-19 concept aircraft that introduces the concept of Tilt-rotor, and later-on the hybrid concept has been realized successfully in late 1980s by MV-22 Osprey (US Marine Corps). FIG. 3 describes MV-22 hybrid solution where two propeller propulsion systems 3A (tilt-rotors) are placed at each end of an airplane wings 3B, with capability to rotate such way that they are in an horizontal position in reference to the wings 3B and aircraft body 3C during takeoff and landing (developing lift in an helicopter-like manner) and they are in a vertical position during cruising, generating direct horizontal thrust and indirectly lift (airplane-like flight for cruising). More recent aircrafts have build on the success of MV-22, one example being AW609 aircraft in early 2000s.

Hovercrafts and lift platforms can be enhanced by (BL) and (CE) phenomena as presented in U.S. Pat. Nos. 6,082, 478, 6,616,094 and 7,581,608, with main focus on efficiency and stability.

Fluid jet blowing on open surface flying methods come with a circular shape, most common refer to as saucer. They require a combination of (CM), (BL) and (CE) phenomena for achieving lift and they are VTOL aircrafts with yet to be determined horizontal flying (cruising) performances and major issues of stability. An early solution is proposed in U.S. Pat. No. 3,276,723, where a ducted fun is proving vertical thrust. In U.S. Pat. No. 4,433,819 a non-rotating center body is combined with a rotating outer body, resulting in an impractical flying saucer-like solution.

U.S. Pat. No. 5,054,713 introduces an spheroidal body that obtains lift from the fluid jets flowing on its upper surface. Following the same method, U.S. Pat. No. 6,270, 036 shows a centrifugal airflow from the center of the circular aircraft creating lift on the upper surface. U.S. Pat. No. 7,857,256 improves on the method by maximizing the (CE) phenomena for a better lift.

All the prior art solutions fell short of providing a practical compact shaped aircraft, with VTOL capability and with maximized payload room, easy to control by ordinary skilled people. Such flying device is highly desirable for mass utilization and the present invention provides an effective solution.

It is critical to emphasize the better efficiency of the airplane flight over the helicopter flight, supported by historical facts and the mechanics of flight. Historically both ways of flight have been conceptually studied as far as 15th century by renowned renaissance figure Leonardo Da Vinci. At the beginning of 20th century first engine powered airplane flight has been successful using the early low power engines available at the time. Only few decades later successful helicopter flight was possible based of much powerful engines available in mid 20th century.

The mechanics of flight are based on Newton's laws that describe the thrust T of a propulsion system as being given by the equation (1) $T=v(dm/dt)$, where v is the velocity of the fluid and dm/dt is the derivative of the expelled mass of fluid. Because the lift L is the vertical trust developed by an aircraft, and it follows a similar equation based on the vertical speed $v_v$ applied to the surrounding fluid (2) $L=v_v(dm/dt)$, one can see that the same lift can be obtained by moving a small quantity of fluid at high speed or by moving a big quantity of fluid at low speed. For airplanes, where the wing area is the main contributor to the air down-movement D that generates lift, it is a practical fact that low-speed moving airplanes have a bigger relative wing area than the high-speed moving airplanes. At the beginning of aviation, successful airplane solutions used multi-wings designs to increase the effective area of the wing, with bi-plane airplane being the most known of them.

There is a second factor that governs the generation of thrust, and that is the power P required by the propulsion system. That can be described by equation (3) $P=Tv$, which leads to (4) $P=v^2(dm/dt)$. For the same trust T generated by a propulsion system, a smaller power is required when a bigger quantity of fluid is moved at a lower speed v. This improved efficiency is reflected in practical designs of modern aviation, with examples as helicopter propeller blades having bigger relative surface, or making use of multiple propellers to increase the effective volume of air that can be moved (case of quad-copters and other multi-propeller solutions), or the highly efficient design of turbo-engines used in modern aviation.

A third critical factor related to the speed of movement to be considered is the drag force DF, force that is acting on any object in relative movement to a fluid medium. For a practical high-speed level expected for an aircraft, the drag forced can be described by a quadratic equation (5) $DF\sim v^2$ and the power required to overcome the drag by a cubic equation (6) $DP\sim v^3$. Moving slower is more efficient for practical aviation, requiring a smaller power to generate the horizontal movement and the lift of the aircraft.

It is important to point out that for a wing providing lift to an aircraft, the action of the wing topside towards the surrounding fluid is the dominant factor in achieving lift, while the action of the bottom-side has a secondary contribution. This is a consequence of the fluid viscosity. The control of the fluid flow on the critical side of the wing can improve the lift efficiency, as presented by U.S. Pat. No. 4,630,997 with application to naval sailing.

BRIEF SUMMARY OF THE INVENTION

As presented in FIG. 1 and FIG. 2 related to airplane and helicopter ways of obtaining lift, the airflow generated by the thrust propeller or propellers is used for directly or indirectly creating lift (vertical movement) and providing cruising flight (horizontal movement). The current invention (hereby referred as FlyCar) is building on the proven benefits of the hybrid solution described in FIG. 3, a combination of the VTOL capabilities of helicopter and the efficient cruising flight of the airplane at high-speed (also known in prior art as transition-mode aircraft).

It is the subject of the current invention to introduce a compact aircraft, with limited footprint and no exposed high-speed moving parts, with an aerodynamic car-like wing-body (FlyCar), with no large wings and producing lift mainly from its body, as what in prior art is also referred as a lifting-body. A multi-propulsion system is built inside of the aircraft body, with a preferable, but not limited to, four such independent systems placed in a Front-left, Front-right, Back-left and Back-right configuration, in such way that the main cabin in central area of the body is dedicated to the passengers and pay-load. The propulsion system can be of various forms, not limited to propellers, tilt-rotors, ducted fans, jet engines, and blowers (centrifugal fans) as long it is embedded into the aircraft body and it has the capability of changing its thrust direction from vertical to horizontal direction.

Furthermore a critical innovative design feature is used in the present invention by controlling the airflow on areas of topside of the aircraft and bottom side of the aircraft, airflow control that is achieved by means of slots in the upper side of the lifting-body and openings for the bottom side, corresponding to each individual propulsion system. For takeoff and landing a vertical airflow is controlled from top to bottom of the aircraft body, as shown in FIG. 9A, with the air being absorbed from the top side through the upper side slots and expelled to the bottom side of the aircraft body through the bottom side openings. As a result the FlyCar achieves a quad-copter like operation with VTOL and low-speed hovering capabilities, with high maneuverability and small area needed for landing and takeoff.

For high-speed flying (cruising) the thrust of the propulsion systems is changed primarily to horizontal direction, the aircraft operating as a lifting-body (FIG. 9B). The drag of the FlyCar aircraft and its aerodynamics are greatly improved by the fact that a part of the upwash air flow on the front of the body is redirected inside and downwards by the front propulsion systems, while part of the downwash air flowing on the top of the body is redirected inside and downwards by the back propulsion systems. An end flap and flaperons system is added to the back of the lifting-body to enhance the overall body lifting area and contribute to the control for Pitch, Roll and Yaw of the FlyCar during high-speed cruising flight. The body of the FlyCar aircraft operates as an effective wing (lifting-body) with enhanced airflow control and embedded internal propulsion system.

In one of the preferred embodiments of the invention, capability for on-land and on-water movement is added to the FlyCar aircraft by the addition of a retractable hovercraft skirt (FIG. 13). By making use of the same propulsion system of the FlyCar, travel capabilities of a hovercraft for road, off-road and water are combined with the airborne power of the aircraft. As a result, an all-medium vehicle is achieved, with land, water and air transportation capability for both low and high-speed movement.

The driver and passenger seats, storage space and fuel reserves are placed in a car-like fashion, with all comfort and accessibility that it provides. Today's digital control and software advances, combined with gyroscopic guiding, motion sensing, GPS, sonar, radar and optic sensors give the proven ability of automatic vertical takeoff and landing for the herein aircraft and the capability of an easy driving by ordinary-skilled people. Furthermore self-driving capability is a possibility, with much more ease in air flight than on road constrained car environment. While not limited to, it is one of the main goals of the present inventions to make use of electric power for propulsion, as a direct generational progress in the aviation.

BRIEF DESCRIPTION OF THE DRAWINGS

The described embodiments and the advantages thereof may best be understood by reference to the following description taken in conjunction with the accompanying drawings. It is understood that these drawings in no way limit any changes in form and detail that may be made to the described embodiments by one skilled in the art without departing from the spirit and scope of the described embodiments.

FIG. 4A, 4B, 4C show the front and side views of a ducted fan with tilting capability, while FIG. 4D show an horizontal cross-section of the same ducted fan used as propulsion system in one of the embodiments of the invention.

FIG. 5A is the front view of a blower (centrifugal fan) with tilting capability, while FIG. 5B and FIG. 5C are side cross-sections of the same blower used as propulsion system in one of the embodiments of the invention.

FIGS. 6A, 6B, 6C and 6D are the side view, top view, back view and front view of the first preferred embodiment of the invention in VTOL mode.

FIGS. 10A, 10B, 10C and 10D are the side view, top view, back view and front view of the first preferred embodiment of the invention in high-speed flying mode.

FIGS. 16A, 16B, 16C and 16D are the side view, top view, back view and front view of the third preferred embodiment of the invention in VTOL mode.

FIG. 17A is the side view of the third preferred embodiment of the invention, and FIG. 17B is a horizontal cross-section of the same third embodiment in VTOL mode.

FIGS. 19A, 19B, 19C, and 19D are the side view, top view, back view and front view of the third preferred embodiment of the invention in high-speed flying mode.

FIG. 20A is the front view of the third preferred embodiment of the invention, and FIG. 20B is a vertical cross-section of the same third embodiment in high-speed flying mode.

DETAILED DESCRIPTION OF THE INVENTION

Figure 1:
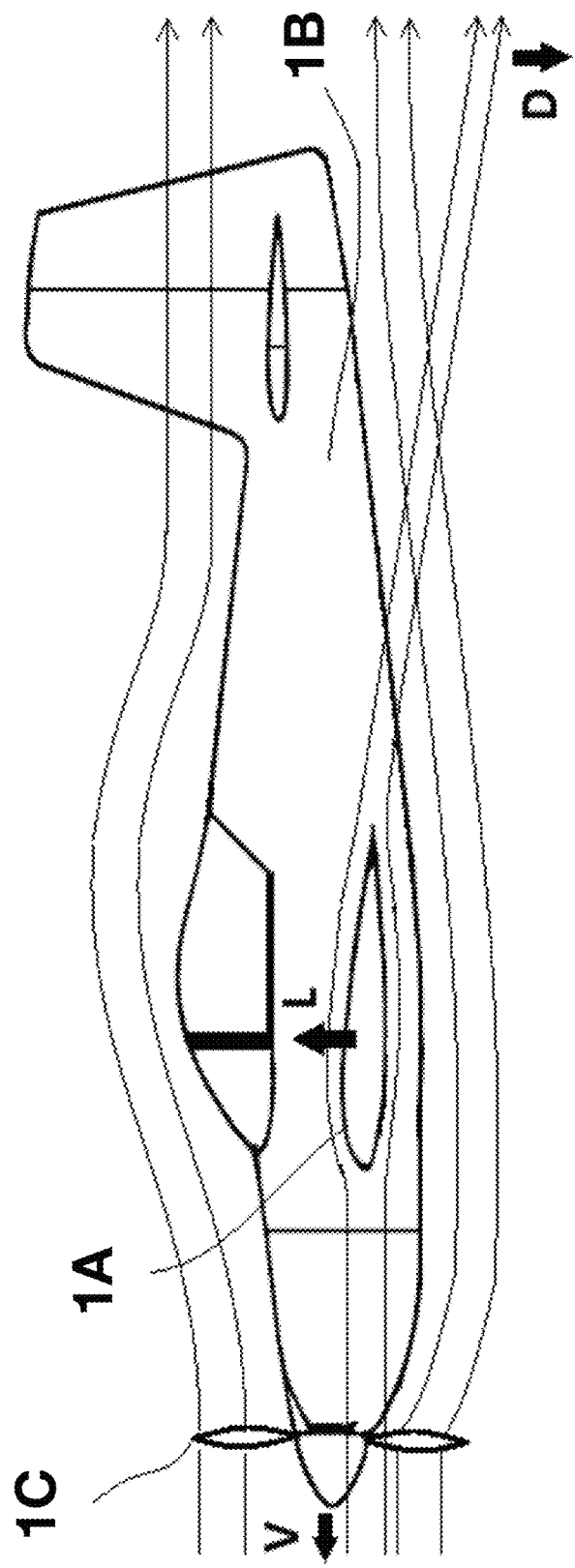
FIG. 1 is the side view of an airplane in flight, as known in prior art.
Figure 2:
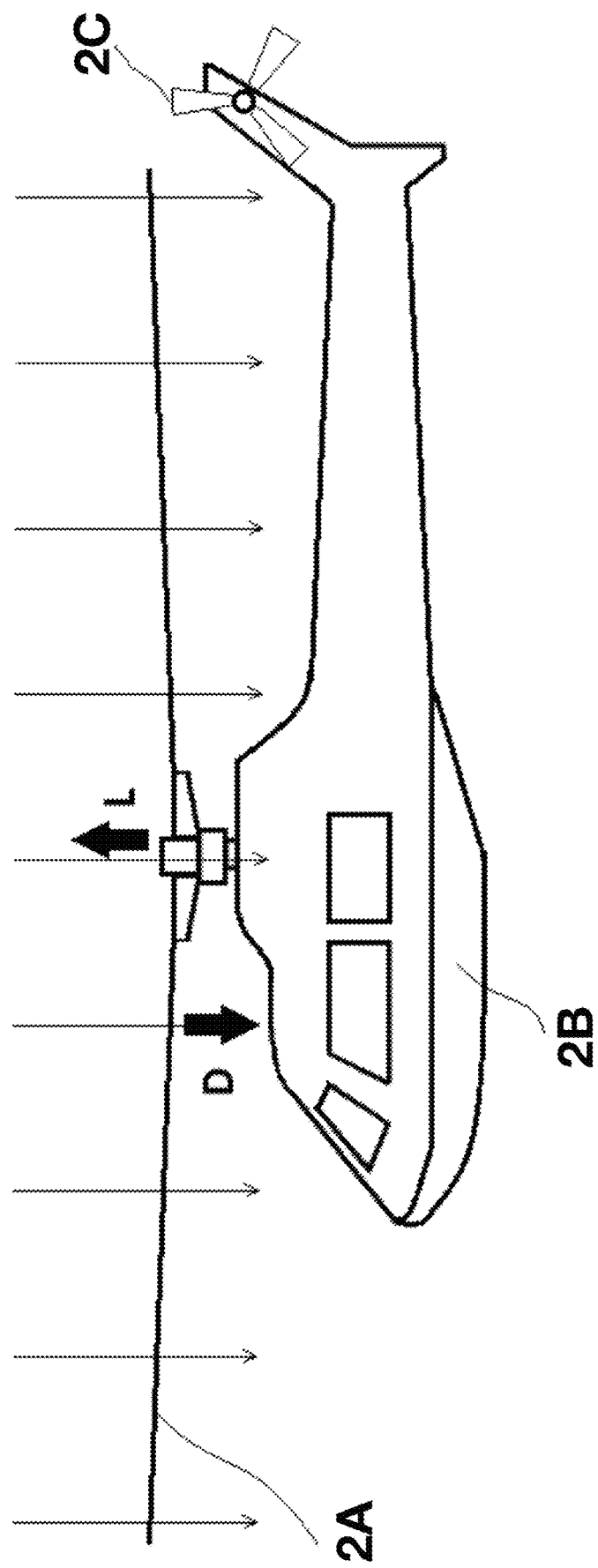
FIG. 2 is the side view of a helicopter in flight, as known in prior art.
Figure 3:
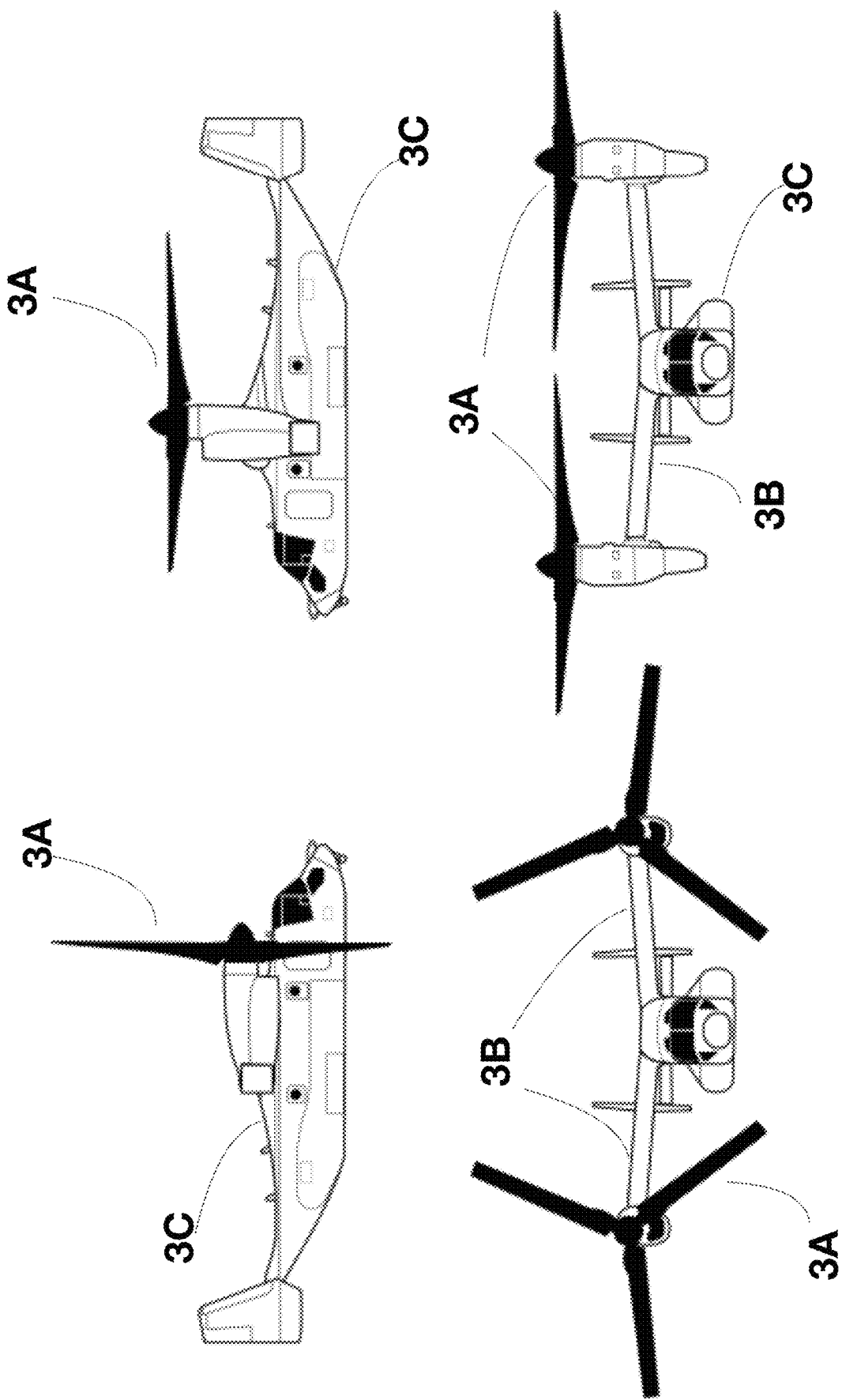
FIG. 3 presents the side and front views of a tilt-rotor aircraft, as known in prior art.

It is understood that the present invention is not limited to the preferred embodiments herein described and it is covering all the possible variations that may be derived by those skilled in the field. These examples are presented solely for context purpose, for helping in the understanding of the described preferred embodiments. It will be apparent to one skilled in the art that the described embodiments may be practiced without some or all of these specific details. In other instances, well known process steps and details have not been fully described in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The present application discloses a compact aircraft, with limited footprint and no exposed high-speed moving parts, with an aerodynamic wing-like body profile (FlyCar), that can vertically takeoff and land, similar with an helicopter, and then cruise at high-speed in an airplane like way.

The herein first preferred embodiment is a compact aircraft, where as depicted in FIGS. 6A, 6B, 6C and 6D, a multi-propulsion system 52 is built inside the aircraft lifting-body 51, with a preferable four such independent systems placed in a Front-left 52A, Front-right 52B, Back-left 52C and Back-right 52D configuration (FIG. 7B), in such way that the main cabin 53 in central area of the body 51 is dedicated to the passengers and pay-load. In embodiments, multi-propulsion system 52 may be completely housed within body 51, such that no wings or propellers extend from body 51.

The said aircraft body 51 has attached at least one flap 30 and at least two flaperons 31 at the rear side (left flaperon 31A and right flaperon 31B), as show in FIG. 10. The said flap 30 and flaperons 31 can be independently retracted or expanded depending on the flying modes, for the purpose of controlling the total lift surface and its effective chord 39, and for controlling the Pitch, Roll and Yaw of the aircraft, as know in prior art.

In the first preferred embodiment of the invention the propulsion system 52 is comprised of ducted fans 5 with tilting capability, as described in FIGS. 4A, B, C and D. The said ducted fan 5 is comprised of a propeller 6 with two or more blades 8, propeller 6 that is mounted inside a cylindrical duct 7, as known in prior art, and it is connected to its electrical motor 9 by means of the rod 11 that also carries internally the electrical power cables that provide power and control to the said electrical motor 9. The said rod 11 is continued to the outside on both sides of the ducted cylindrical body 7 by the axel 10, which is used for mounting the ducted fan 5 to the inner side of the aircraft body 51, providing also the capability of tilting (rotate on horizontal axes of axel 10) of the said ducted fan 5.

It is the preferred implementation of the herein first embodiment of the invention, but not limited to, that the four propulsion systems 52 comprised of ducted fans 5 are placed inside of, and encompassed by, the aircraft body 51 by means of the axel 10 in the cavities 32 of the body (FIG. 7B—horizontal cross-section of a lower portion of body 51, and FIG. 8B—vertical cross-section of the left side of body 51), such that 52A system is in front-left cavity 32A and its fan 5 propeller rotates clock-wise, 52B system is in front-right cavity 32B and its fan propeller rotates counter clock-wise, 52C system is in back-left cavity 32C and its fan propeller rotates clock-wise, and 52D system is in back-right cavity 32D and its fan propeller rotates counter clock-wise (FIG. 7B), and in such way that the main cabin 53 is placed in the central area of the aircraft body 51. It is understood that in a stead-state operation the sum of all angular momentums of propulsion systems 52 can be zero, creating a stable flight.

Figure 7A:
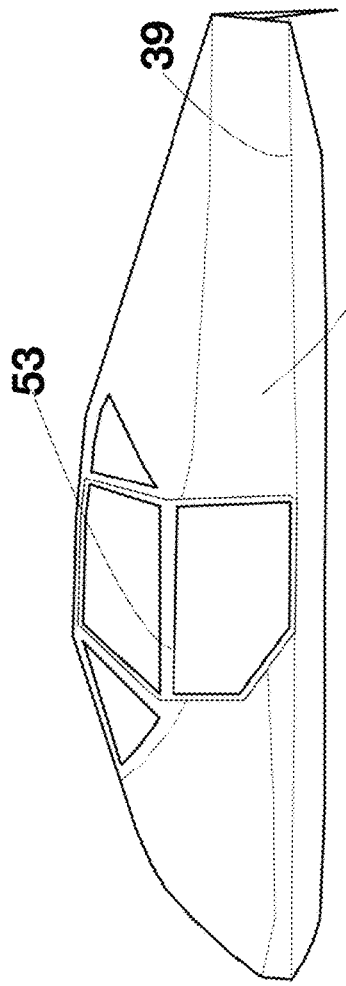
FIG. 7A is the side view of the first preferred embodiment of the invention.
Figure 7B:
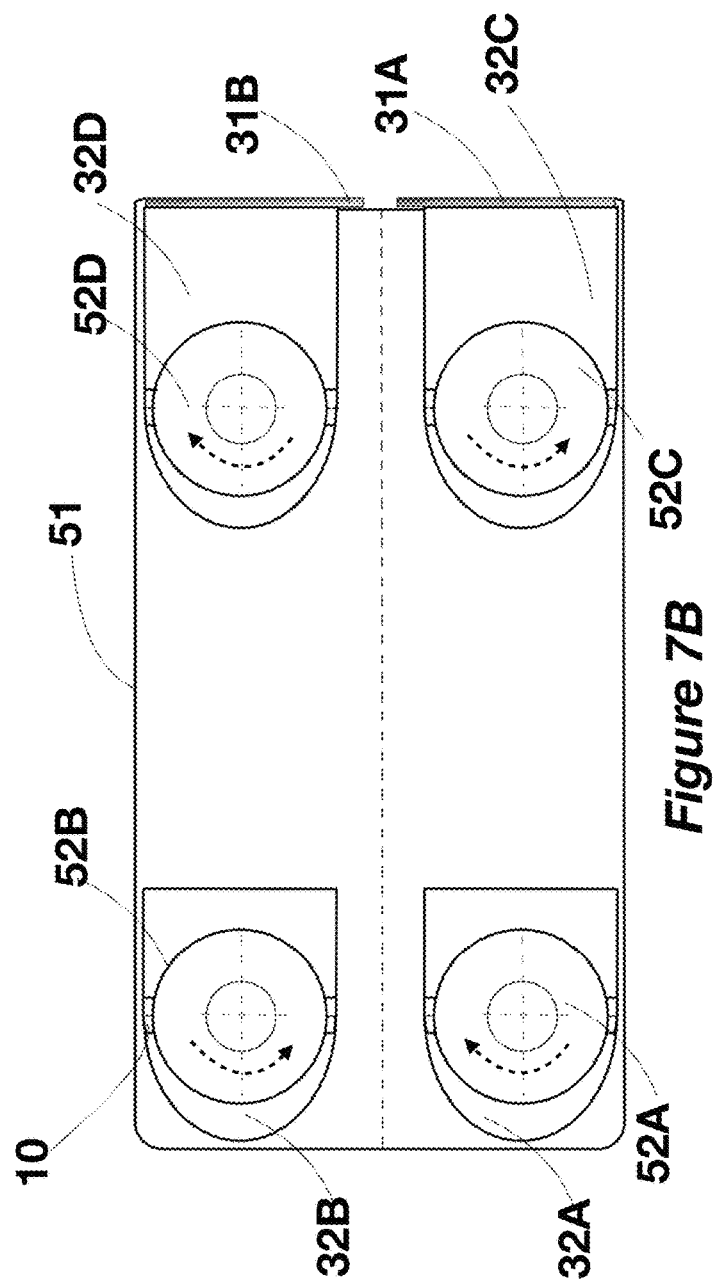
FIG. 7B is a horizontal cross-section of the same first embodiment in VTOL mode.
Figure 8A:
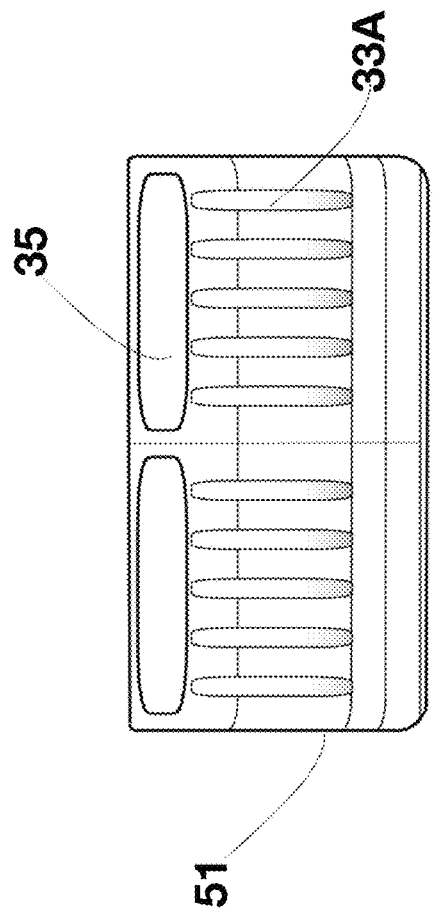
FIG. 8A is the front view of the first preferred embodiment of the FlyCar aircraft, with FIG. 8B showing a vertical cross-section of the same first embodiment of the invention in VTOL mode.

It is the preferred implementation of the present invention that each of the internal cavities 32 are corresponding to slots in the upper side of the lifting-body 51 and openings for the bottom side of the body 51, such as front-left cavity 32A is facing top side slots 33A and bottom opening 34A, front-right cavity 32B is facing top side slots 33B and bottom opening 34B, back-left cavity 32C is facing top side slots 33C and bottom opening 34C, and back-right cavity 32D is facing top side slots 33D and bottom opening 34D (FIG. 6, FIG. 7 and FIG. 8).

Figure 8B:
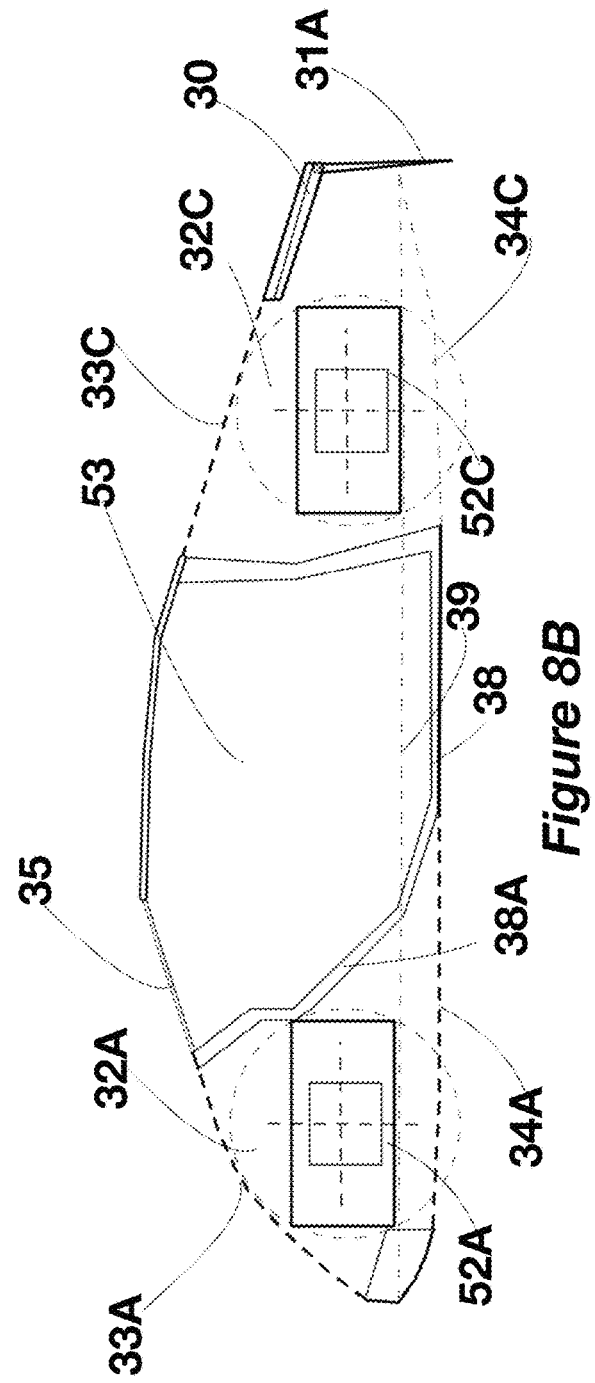
Figure 9A:
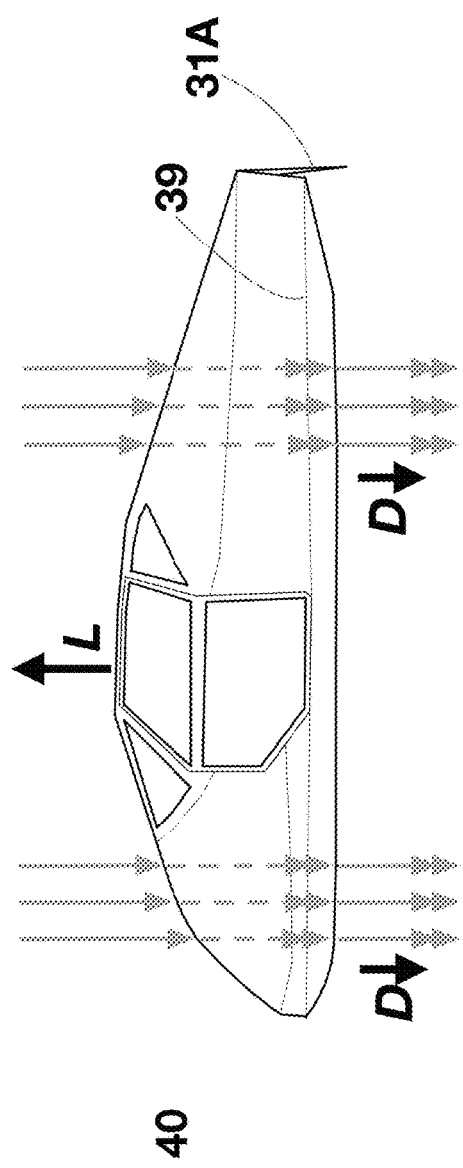
FIG. 9A is the side operational view of the first preferred embodiment of the FlyCar invention during VTOL mode, with FIG. 9B showing the side operational view during the high-speed flying mode for the first preferred embodiment of the invention.
Figure 9B:
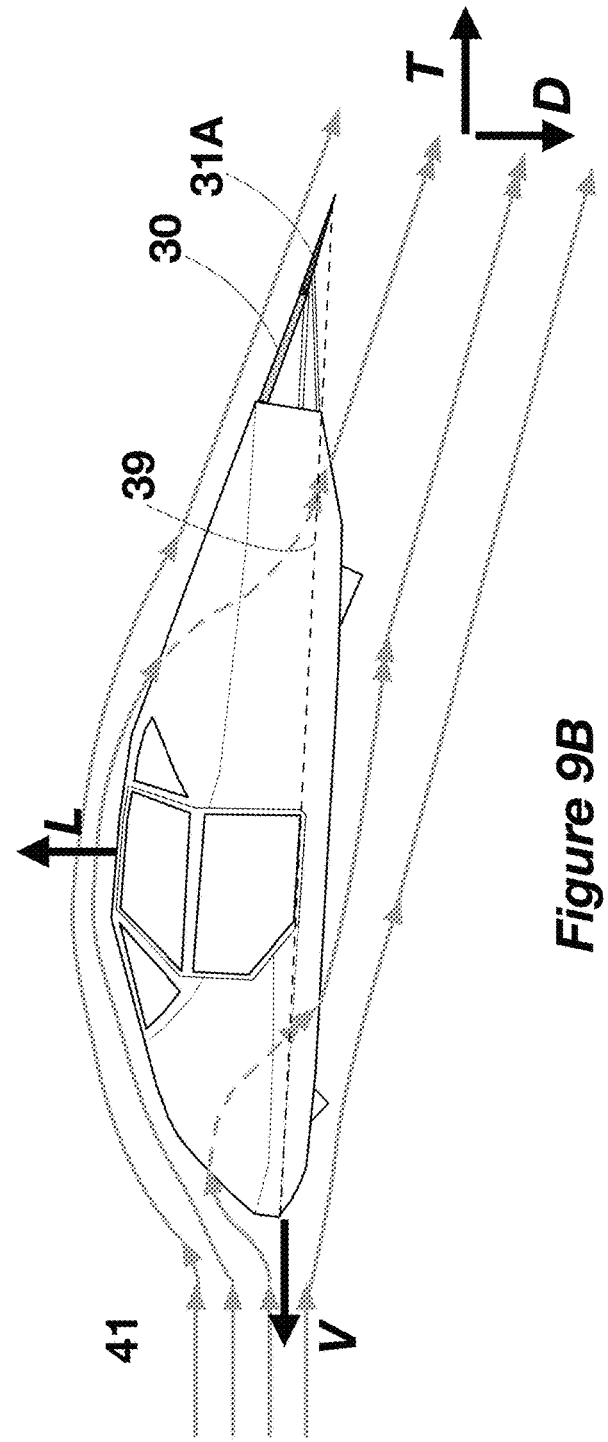
Figure 11A:
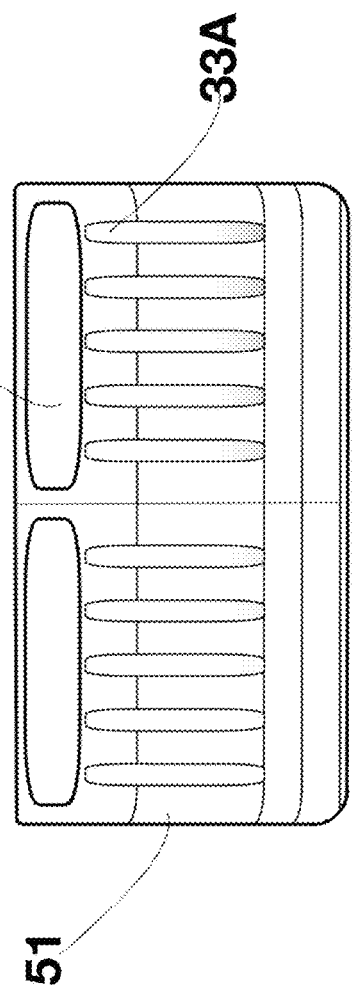
FIG. 11A is the front view of the first preferred embodiment of the invention.
Figure 11B:
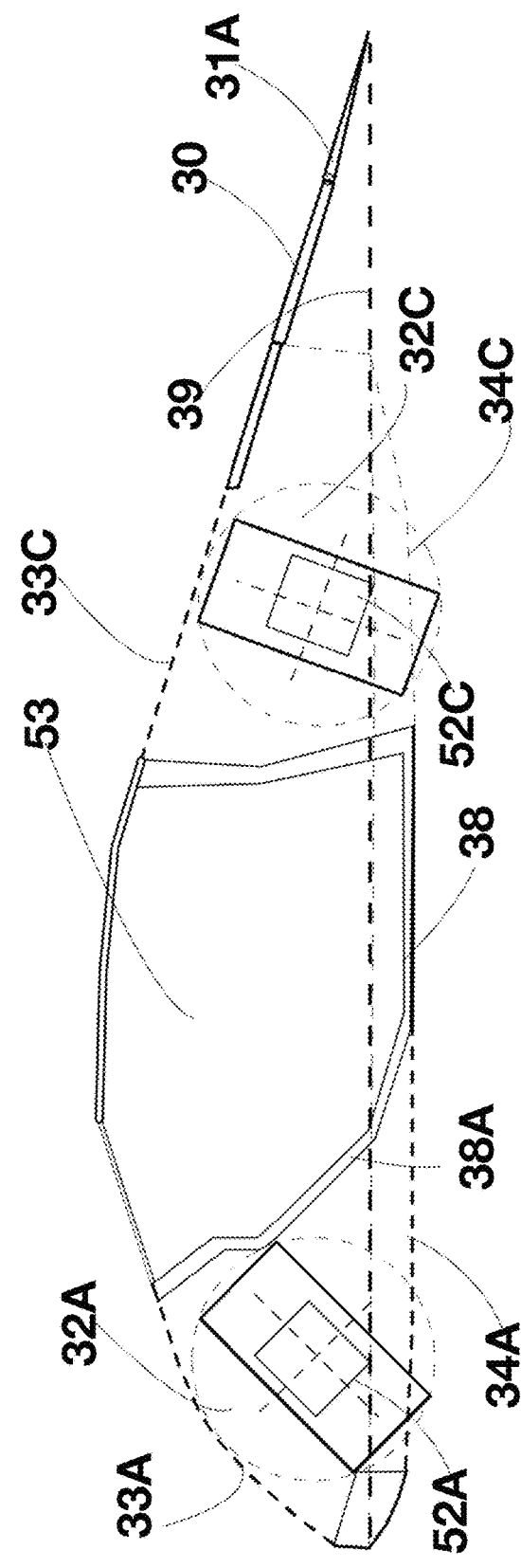
FIG. 11B is a horizontal cross-section of the same first embodiment in high-speed flying mode.

Furthermore the said cavities 32, top side slots 33 and bottom side openings 34 are having the placement and shape to facilitate both a mainly vertical flow of exhaust air and vertical trust D when the propulsion systems 52 are in vertical position for VTOL operation mode (FIG. 8B and FIG. 9A) and a mainly horizontal exhaust air flow for horizontal thrust T when the propulsion systems 52 are tilted in mainly horizontal position for high-speed cruising operation mode (FIG. 9B and FIG. 11B).

It is understood that the main traveling mode of the aircraft is forward-moving; therefore the cabin 53 shape is tailored to a corresponding aerodynamic shape of body 51, being placed in a central area of the said body 51 and corresponding to the highest vertical profile of the aircraft body 51, in order the maximize the pay-load volume capability. As shown in FIG. 6, FIG. 7 and FIG. 8, the cabin 53 is comprised, but not limited to, by at least one front windshield 35, at least one access door 36, and at least one side-window 37, where the said windshield 35, access door 36 and side-window 37 are part of the aerodynamic lifting-body 51. As shown in FIG. 8, the herein main cabin 53 is further comprised by a shell 38 that is internal to the body 51 and delimits the cabin area from the propulsion systems 52. The said shell 38 has such shape for its front lower side 38A that facilitates a easy non-turbulent air flow when the front systems 34A and 34B are generating trust in the main horizontal direction. Cabin 53 is containing at least passenger seats, control board and storage area, with the ergonomically features covering all the possible variations that may be derived by those skilled in the field.

It is understood that for the subject of the invention the four propulsion systems 52 can be controlled independently in respect of thrust level (propellers 6 RPM) and thrust direction and that in combination with the deployment of the flap 30 and flaplerons 31 can produce two main operation modes for the FlyCar aircraft, VTOL mode 40 (as described in FIG. 6, FIG. 7, FIG. 8 and FIG. 9A) and high-speed cruising mode 41 (as described in FIG. 9B, FIG. 10, FIG. 11 and FIG. 12). However the invention is not limited to these two operation modes, covering any practical combination that may be derived by those skilled in the field.

The said VTOL operation mode 40 is obtained by maintaining the thrust of propulsion system 52 in vertical direction, such that the generated thrust D is mainly vertical, creating direct lift L, as shown in FIG. 7, FIG. 8 and FIG. 9A. The said VTOL operation mode 40 is also defined, but not limited to, by the flap 30 being in retracted position inside of the body 51 and the flaperons 31 being retracted in mainly vertical position, minimizing the overall footprint of the aircraft, as detailed in FIG. 8B.

The herein VTOL mode 40 of the first preferred embodiment of invention is obtaining aircraft takeoff, landing and small speed movement (hovering) by creating lift L from the vertical thrust D of the four propulsions systems 52 (FIG. 9A), whose operation is facilitated by the top side slots 33 and bottom side openings 34, and it is obtaining control of the Pitch, Roll and Yaw of the aircraft by independently adjusting the thrust (fan RPM) of the said systems 52A, 52B, 52C and 52D, in quad-copter manner, as know in prior art.

The said high-speed flying operation mode 41 of the FlyCar aircraft is obtained by maintaining the thrust of propulsion system 52 in mainly horizontal direction, such that the generated thrust T is horizontal, creating indirect direct lift L from the high-speed movement V of the aircraft lift-body 51, that results in an effective down-push D of the surrounding fluid, as shown in FIG. 9B, FIG. 10, FIG. 11 and FIG. 12. The said high-speed flying mode 41 is also defined, but not limited to, by the flap 30 being in extended position outside of the body 51 and the flaperons 31 being extended in mainly horizontal position, maximizing the overall footprint of the aircraft and wing-like shape of the aircraft lifting-body 51, as detailed in FIG. 11B (vertical cross-section of left side of the body 51).

Figure 12:
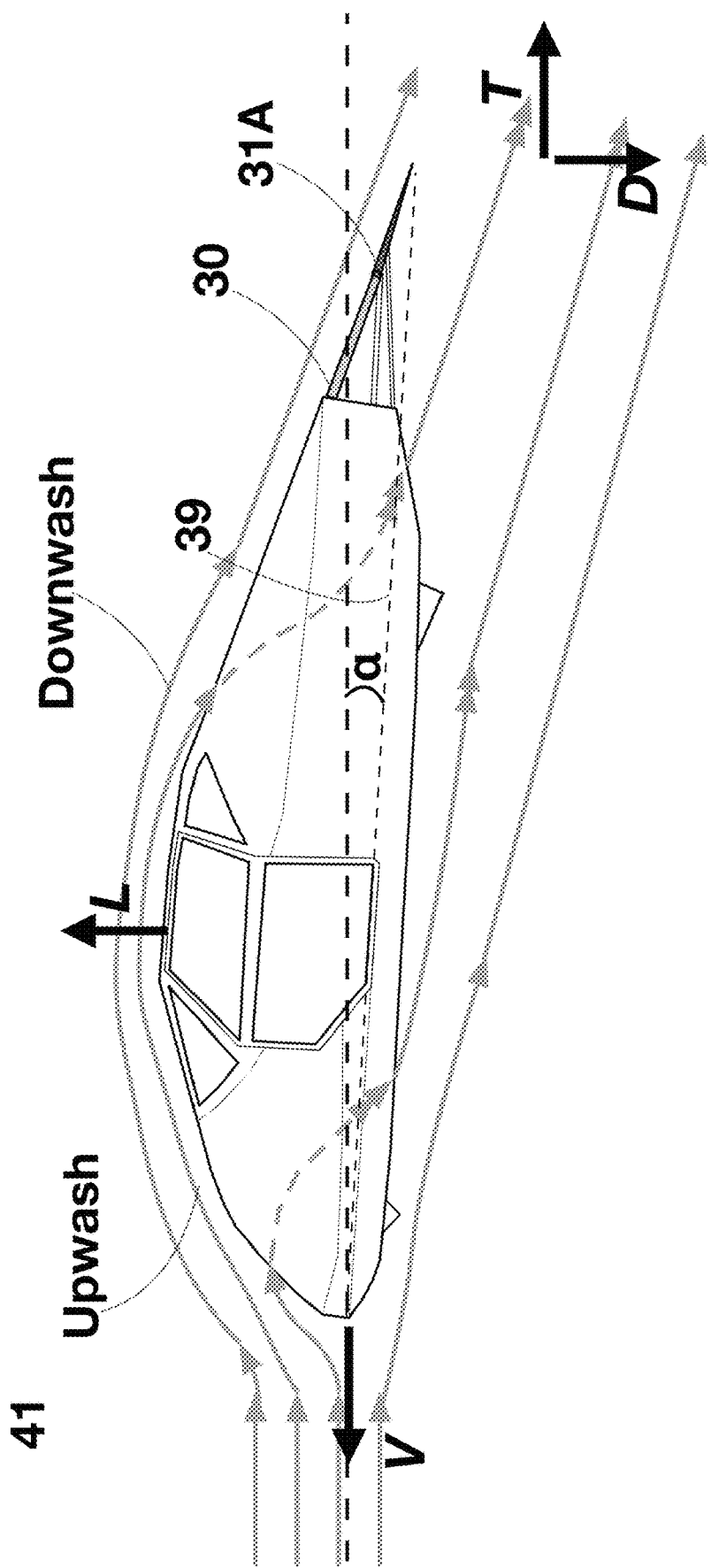
FIG. 12 is the operational view during the high-speed flying for the first preferred embodiment of the invention.
Figure 13C:
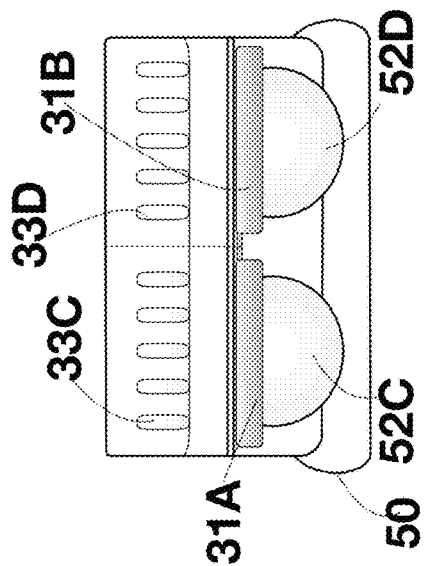
FIGS. 13A, 13B, 13C and 13D are the side view, top view, back view and front view of the second preferred embodiment of the invention in hovercraft mode.
Figure 13D:
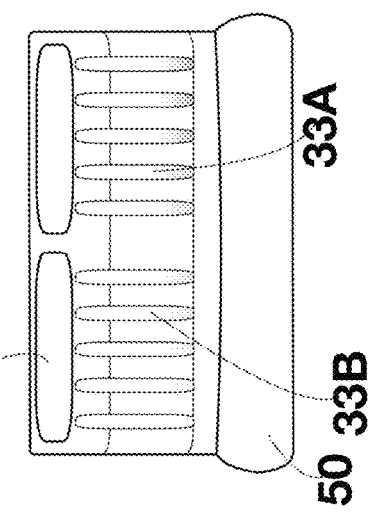
Figure 13A:
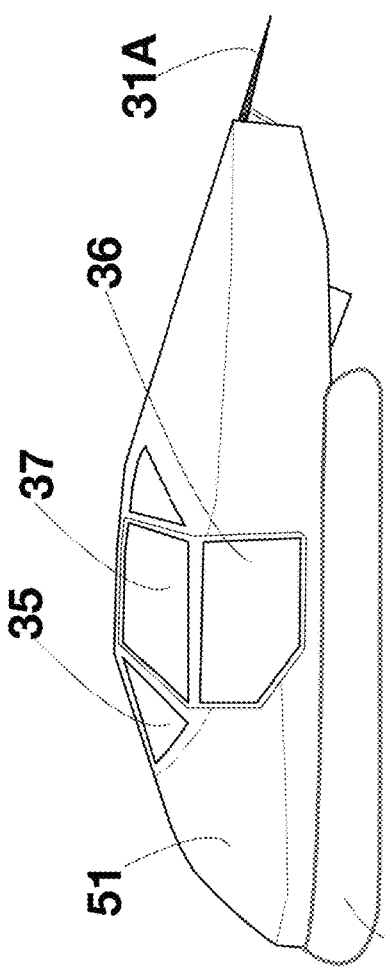
Figure 13B:
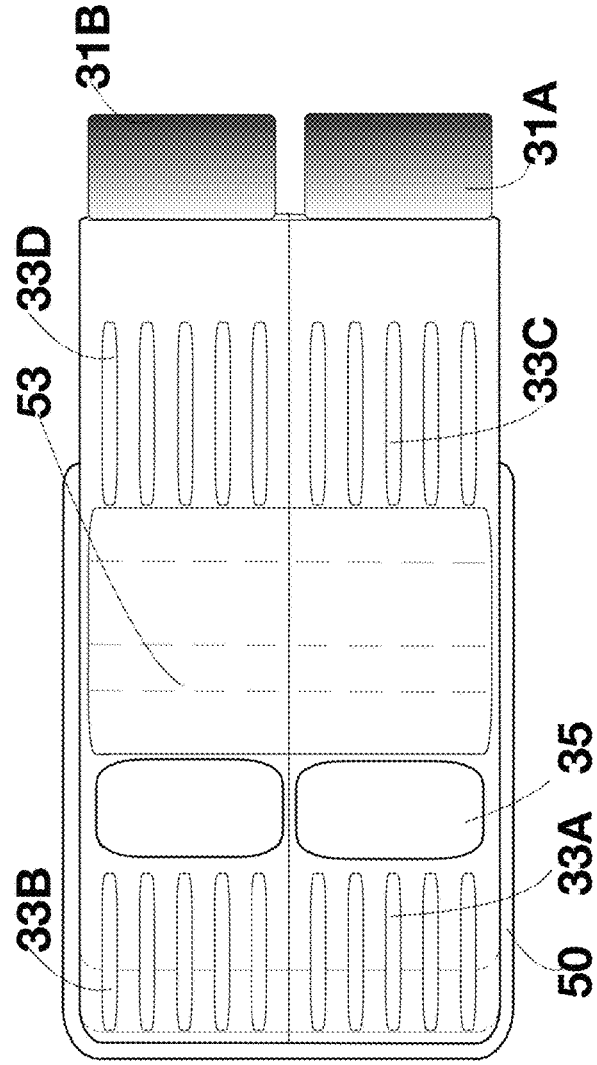

The herein high-speed flying operation mode 41 for the aircraft of the first embodiment of invention is maintaining high-speed horizontal movement (cruising) by generating the velocity V of aircraft from the mainly horizontal thrust T of the four propulsions systems 52 (FIG. 9B, FIG. 12), whose operation is enhanced by controlling the up-wash air flow on top-front side of the aircraft body 51 and the downwash flow of the top-end side of the aircraft body 51 by means of slots 33 on top side and bottom side openings 34. The operation mode 41 is obtaining control of the Pitch, Roll and Yaw of the aircraft by independently adjusting the thrust (and RPM) of the said systems 52A, 52B, 52C and 52D, and by independently adjusting the area and the angles of the flap 30 and flaperons 31. It is understood that during high-speed operation mode 41 the control of the aircraft Pitch is critical to optimize the amount of lift L, control obtained by means of adjusting of the effective angle of attack a of the said aircraft body 51, angle of attack defined by the direction of movement V of the aircraft and its body effective chord 39 direction, in a similar manner to the wing pitch control of an airplane (FIG. 12).

It is understood and covered by the herein invention that the FlyCar aircraft can transition between the two said main operation modes 40 and 41, with any practical combinations that may be derived by those skilled in the field.

Figure 14A:
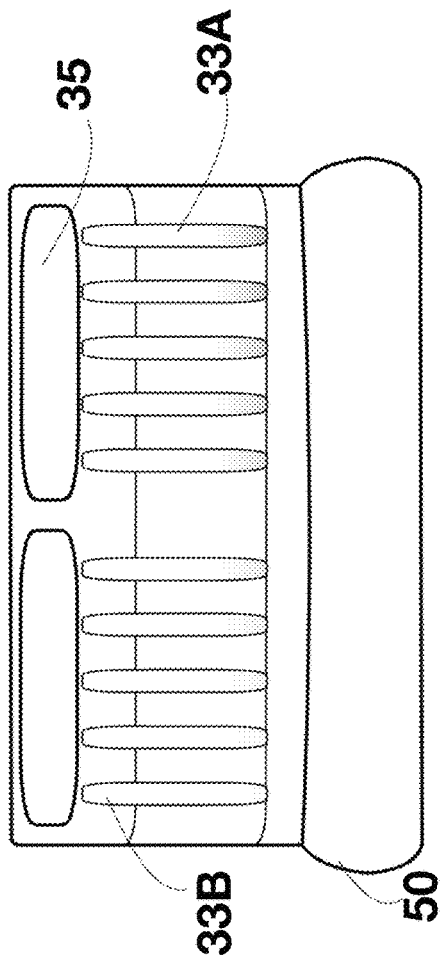
FIG. 14A is the front view of the second preferred embodiment of the invention.
Figure 14B:
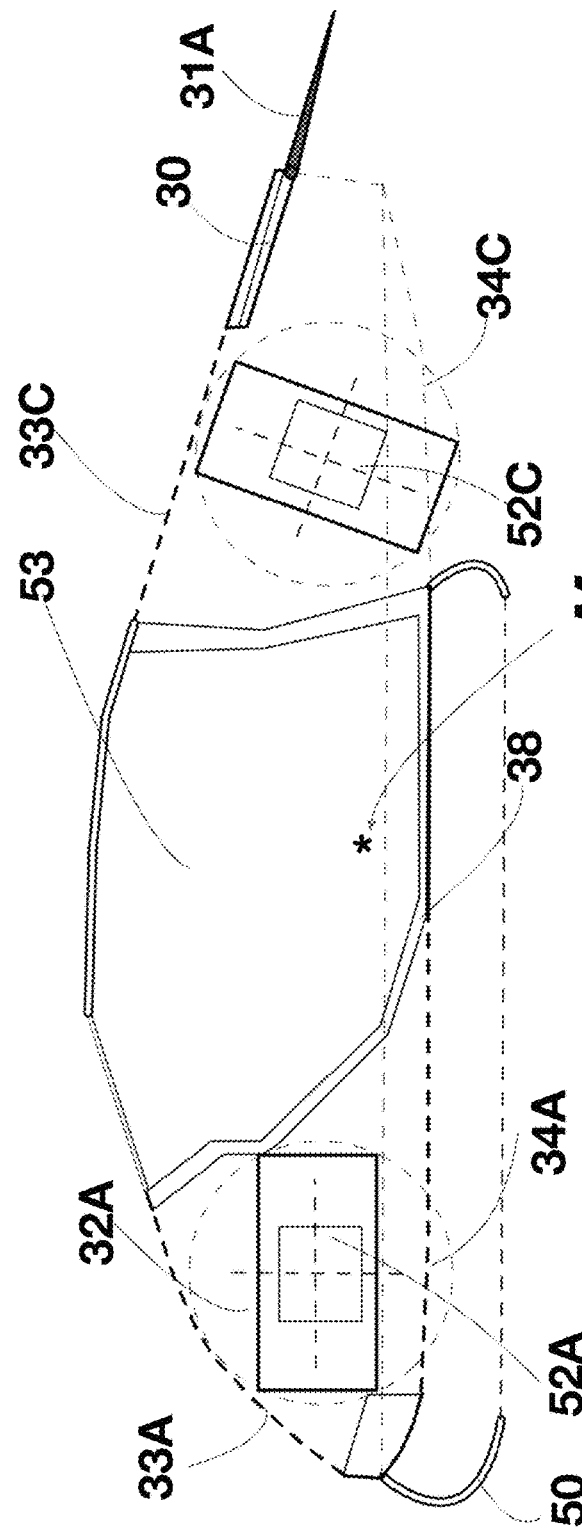
FIG. 14B is a vertical cross-section of the same second embodiment in hovercraft mode.
Figure 15:
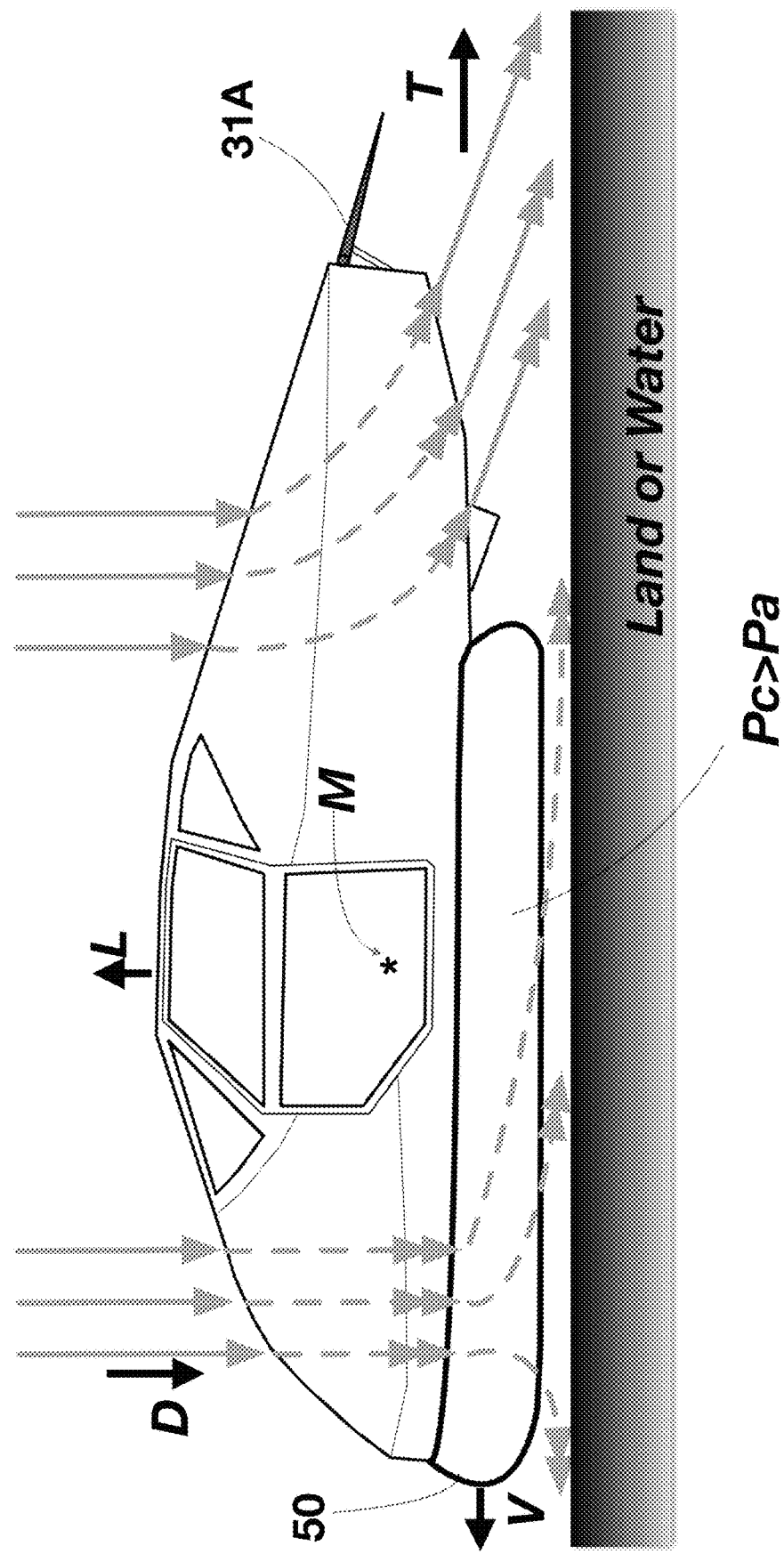
FIG. 15 is the operational view during the hovercraft mode for the second preferred embodiment of the invention.

In the second preferred embodiments of the invention, capability for on-land and on-water movement is added to the FlyCar aircraft of first preferred embodiment by the addition of a retractable hovercraft skirt 50 (FIG. 13, FIG. 14 and FIG. 15), where the general functionality of the flexible skirt is known in prior art. While not limited to the particular implementation herein described, the second embodiment of the FlyCar invention is comprised by the first embodiment of the invention and an retractable flexible skirt 50 that is attached to the body 51 on the bottom side of the said body 51, where said skirt 50 is extending from the front edge of the body 51, on the side edges of the body 51, under the front-left cavity 32A and front-right cavity 32B, and continuing under the main cabin 53, and ending at the limit between cabin shell 38 and the back cavities 32C and 32D, which contain the back propulsion systems 52C and 52D, in such way that it creates a closed area between the lower side of the body 51 and the land or water surface, on which the said body 51 sits, and the mass center M of the aircraft body 51 is well inside of the footprint of the said skirt 50 (FIG. 14B—detailed vertical cross-section of left side of second embodiment).

It is the intention of herein second embodiment of the invention that a hovercraft amphibious mode of operation 42 is realized when the aircraft FlyCar is on land or water by using the front propulsion systems 52A and 52B to create an air cushion contained by the 50 while the said front propulsion systems are operating in mainly vertical position, air cushion that has a pressure Pc above the atmospheric pressure Pa (FIG. 14B and FIG. 15), as described by equation (7) Pc>Pa. The said amphibious mode 42 is characterized by using the back propulsion systems 52C and 52D in mainly horizontal position to generate a horizontal trust T for forward movement V, and by extending the flaperons 31 in a mainly horizontal position.

It is understood that the main traveling direction for amphibious mode 42 is forward-moving with the overall movement speed V being determined by the amount of total thrust delivered by the back-side propulsion systems 52C and 52D, and that the steering at low-speed movement is achieved by independently controlling the thrust of front propulsion systems 52A and 52B (fan RPM), creating a non-zero angular moment, and that the steering at high-speed movement is achieved by independently controlling the thrust of propulsion systems 52C and 52D—turning to left by increasing 52D thrust versus 52C and turning to right by increasing 52C thrust versus 52D thrust.

It is understood and covered by the herein second embodiment that the FlyCar aircraft can transition between the said main operation modes 40, 41 and 42, by deploying or retracting the flexible skirt 50, changing independently thrust level and thrust direction for all propulsion systems 52 and by extending, retracting and controlling the angles for the flap 30 and flaperons 31, with any practical combinations that may be derived by those skilled in the field.

By making use of the same propulsion system of the FlyCar, travel capabilities of a hovercraft for road, off-road and water are combined with the airborne power of the aircraft. As a result, an all-medium vehicle is achieved, with land, water and air transportation capability for both low and high-speed movement.

In the third preferred embodiment of herein invention, the propulsion system is comprised of blowers 12 (centrifugal fan) with tilting capability, as described in FIGS. 5A, 5B and 5C. As known in prior art, the blower 12 is comprised of housing 13 that has intake openings 14 on both lateral sides and a single exit opening 15 at the housing 13 extremity, where the orientation of the said exit opening 15 controls the direction of the thrust T generated by the blower 12. The herein blower 12 is further comprised by a centrifugal cylindrical cage 16 that holds the impellers 17, and where the cage 16 can rotate on its axes 18.

The said cage 16 is connected by the spokes 19 to the electrical motor 20, through its driving shaft 21, which is aligned with the axes 18 of the cage 16. Is the embodiment of the present invention that the housing 13 can rotate (tilt) on the axes 18 of the motor 20 and cage 16 assemble by means of the housing intake extensions 22, such that the cage 16 and motor 20 are remaining fix on their axes and steady in rapport to and external reference, and the resulting blower trust T can be controlled from a vertical direction (FIG. 5B) to an horizontal direction (FIG. 5C) by the angular position of housing 13 and its exit opening 15.

As depicted in the third preferred embodiment of the invention (FIGS. 16A, 16B, 16C and 16D), a multi-propulsion system 52 is built inside the aircraft lifting-body 51, with a preferable four such independent systems placed in a Front-left 52A, Front-right 52B, Back-left 52C and Back-right 52D configuration (FIG. 17B), in such way that the main cabin 53 in central area of the body 51 is dedicated to the passengers and pay-load.

The herein aircraft body 51 has attached at least one flap 30 and at least two flaperons 31 at the rear side (left flaperon 31A and right flaperon 31B), as show in FIG. 20. The said flap 30 and flaperons 31 can be independently retracted or expanded depending on the flying modes, for the purpose of controlling the total lift surface and the Pitch, Roll and Yaw of the aircraft, as know in prior art.

It is the preferred implementation of the herein third embodiment of the invention, but not limited to, that the four propulsion systems 52 comprised of blowers 12 are placed inside of the aircraft body 51 by means of the housing intake extensions 22 in the cavities 54 of the body (FIG. 17B—horizontal cross-section, and FIG. 18B—vertical cross-section of the left side of body 51), such that 52A system is in front-left cavity 54A and its blower cage rotates clock-wise, 52B system is in front-right cavity 54B and its blower cage rotates counter clock-wise, 52C system is in back-left cavity 54C and its blower cage rotates clock-wise, and 52D system is in back-right cavity 54D and its blower cage rotates counter clock-wise (FIG. 17B), and in such way that the main cabin 53 is placed in the central area of the aircraft body 51. It is understood that in a stead-state operation the sum of all angular momentums of propulsion systems 52 can be zero, creating a stable flight.

Figure 18A:
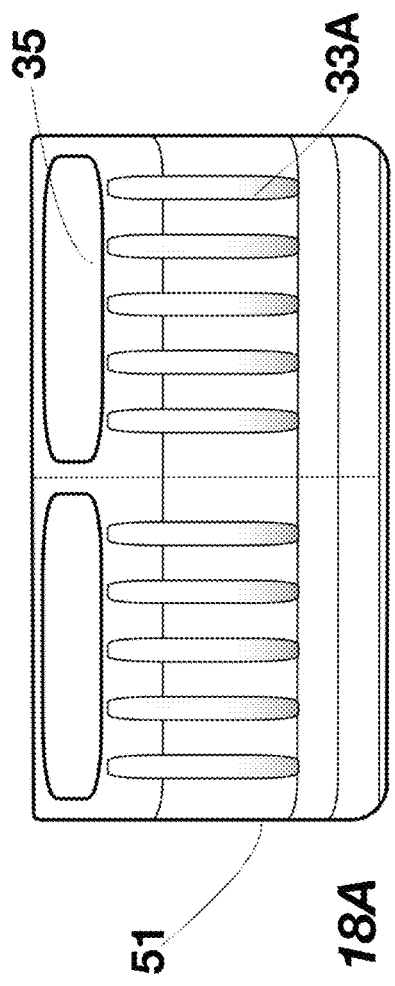
FIG. 18A is the front view of the third preferred embodiment of the FlyCar aircraft invention, with FIG. 18B showing a vertical cross-section of the same third embodiment of the invention in VTOL mode.

It is the preferred implementation of the present invention that each of the internal cavities 54 are corresponding to slots in the upper side of the lifting-body 51 and openings for the bottom side of the body 51, such as front-left cavity 54A is facing top side slots 33A and bottom opening 34A, front-right cavity 54B is facing top side slots 33B and bottom opening 34B, back-left cavity 54C is facing top side slots 33C and bottom opening 34C, and back-right cavity 54D is facing top side slots 33D and bottom opening 34D (FIG. 16, FIG. 77 and FIG. 18).

Furthermore the said cavities 54, top side slots 33 and bottom side openings 34 are having the placement and shape to facilitate both a mainly vertical flow of exhaust air and vertical trust D when the propulsion systems 52 have exit openings 15 in vertical position for VTOL operation mode (FIG. 18B and FIG. 21A) and a mainly horizontal exhaust air flow for horizontal thrust T when the propulsion systems 52 have exit openings 15 tilted in horizontal position for high-speed cruising operation mode (FIG. 20B and FIG. 21B), with the air flow being helped by the shape of 38A shell for front propulsion and the shape of the rear body part 70 for the back propulsion.

It is understood that the main traveling mode of the aircraft is forward-moving; therefore the cabin 53 shape is tailored to a corresponding aerodynamic shape of body 51, being placed in a central area of the said body 51 and corresponding to the highest vertical profile of the aircraft body 51, in order the maximize the pay-load volume capability. The cabin 53 is comprised, but not limited to, by at least one front windshield 35, at least one access door 36, and at least one side-window 37, where the said windshield 35, access door 36 and side-window 37 are part of the aerodynamic lifting-body 51. The herein main cabin 53 is further comprised by a shell 38 that is internal to the body 51 and delimits the cabin area from the propulsion systems 52, where the said shell 38 has such a shape for its front lower side 38A that facilitates an easy non-turbulent air flow when the front systems 34A and 34B are generating trust in the main horizontal direction. The said cabin 53 is containing at least passenger seats, control board and storage area, with the ergonomically features covering all the possible variations that may be derived by those skilled in the field.

Figure 21A:
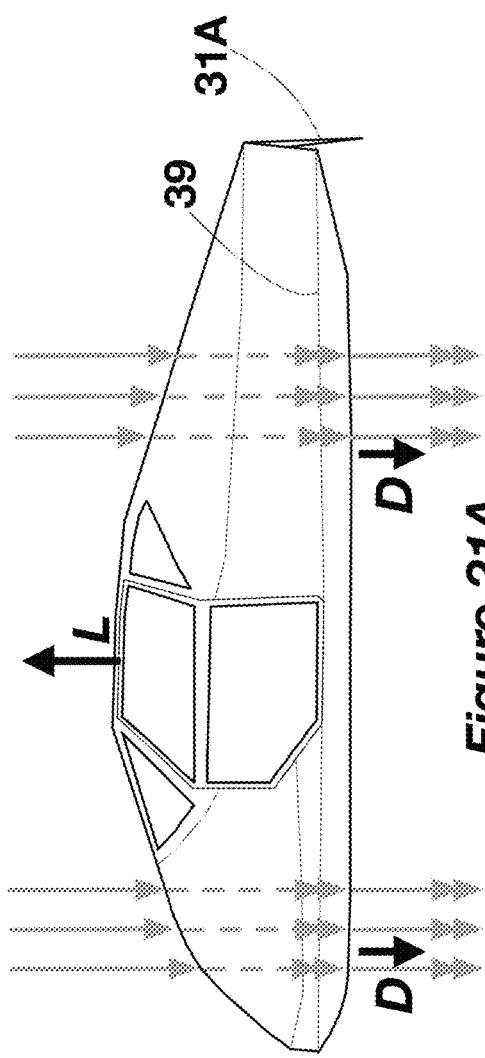
FIG. 21A is the side operational view of the third preferred embodiment of the FlyCar invention during VTOL mode, with FIG. 21B showing the side operational view during the high-speed flying mode for the third preferred embodiment of the invention.
Figure 21B:
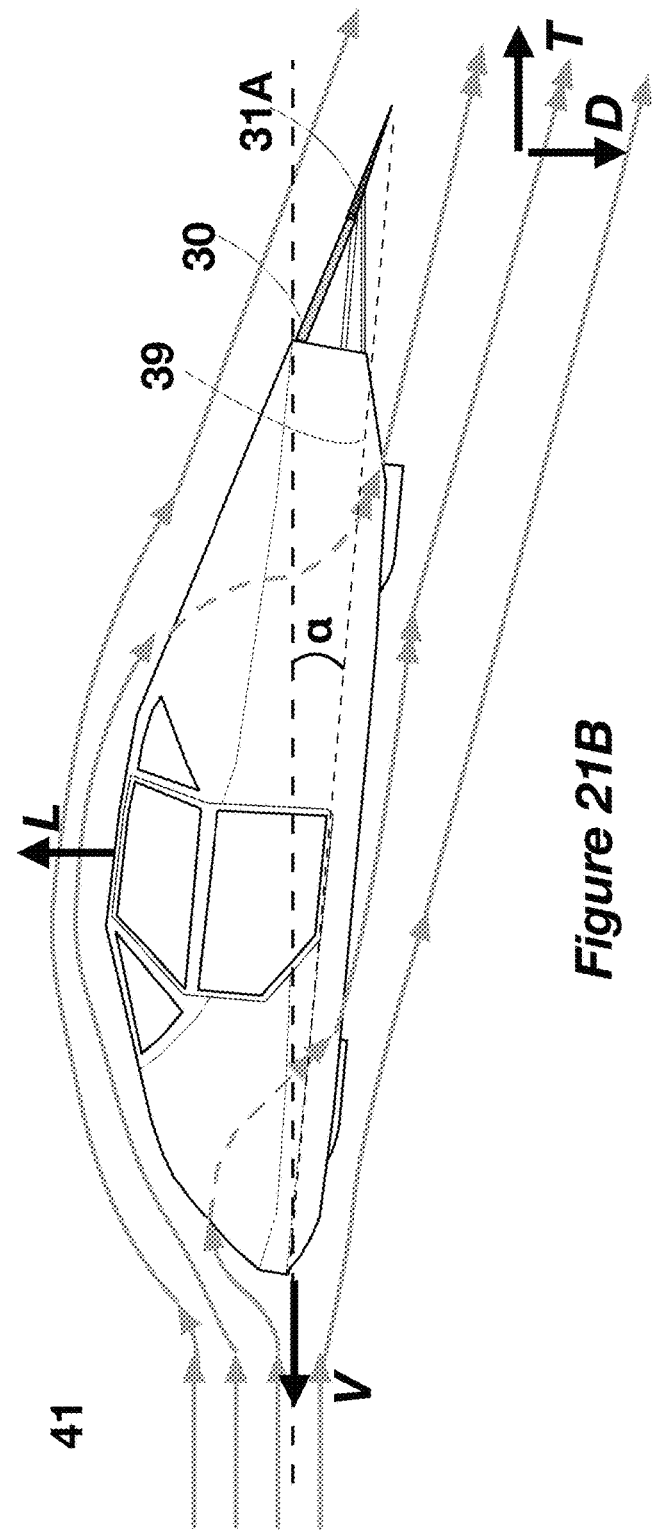
Figure 22A:
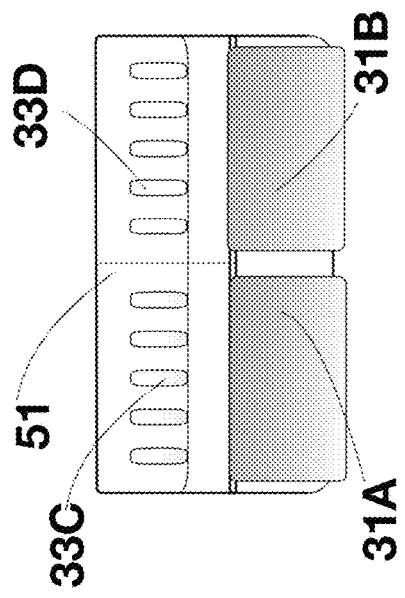
FIGS. 22A, 22B, 22C and 22D are the side view, top view, back view and front view of the fourth preferred embodiment of the invention in VTOL mode.
Figure 22B:
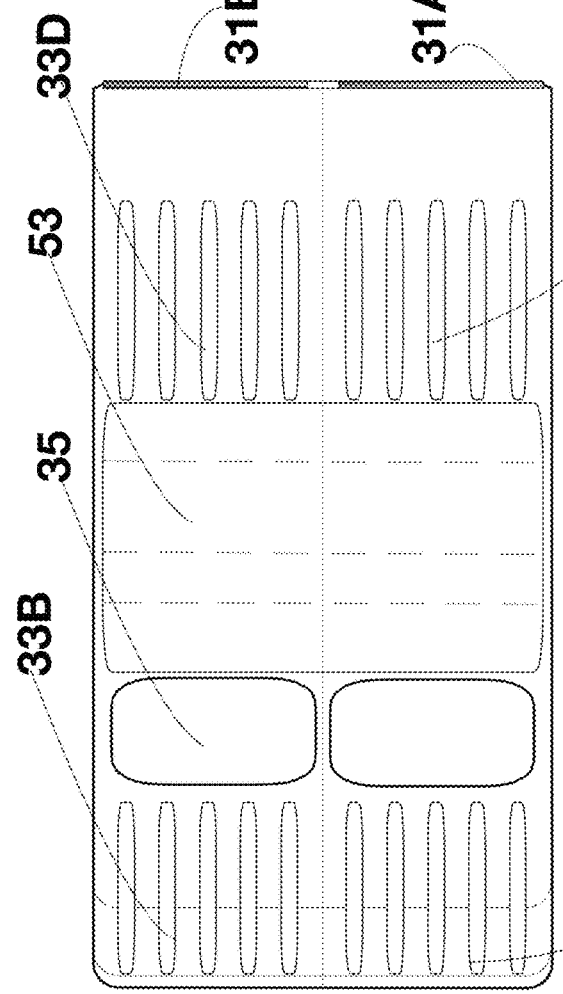
Figure 22C:
Figure 22D:
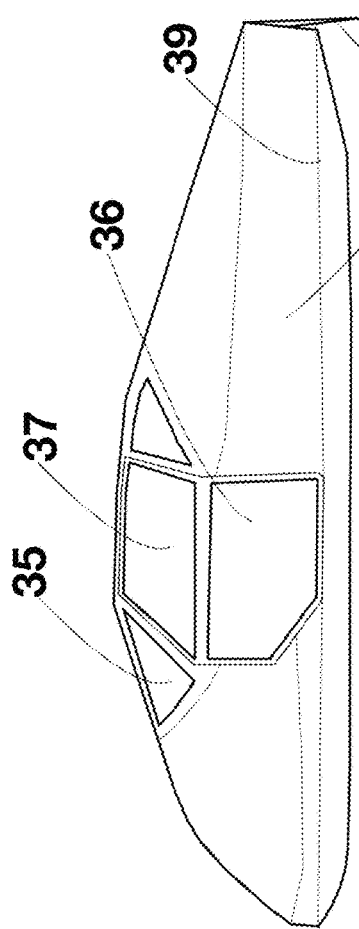

It is understood that for the subject of the invention the four propulsion systems 52 can be controlled independently in respect of thrust level and thrust direction and that in combination with the deployment of the flap 30 and flaperons 31 can produce two main operation modes for the FlyCar aircraft, VTOL mode 40 (as described in FIG. 16, FIG. 17, FIG. 18 and FIG. 21A) and high-speed cruising mode 41 (as described in FIG. 19, FIG. 20, and FIG. 21B). However the third embodiment of herein invention is not limited to these two operation modes, covering any practical combination that may be derived by those skilled in the field.

Figure 18B:
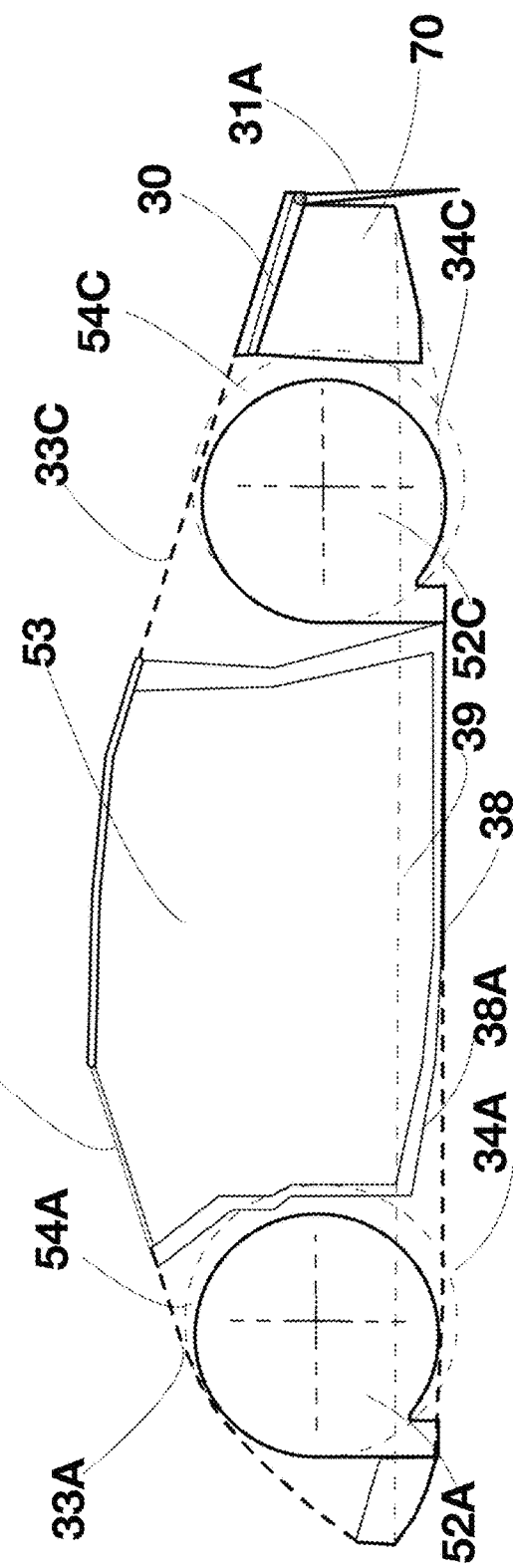

The said VTOL operation mode 40 is obtained by maintaining the thrust of propulsion systems 52 in vertical direction, such that the generated thrust D is mainly vertical, creating direct lift L, as shown in FIG. 17, FIG. 18 and FIG. 21A. The said VTOL operation mode 40 is also defined, but not limited to, by the flap 30 being in retracted position inside of the body 51 and the flaperons 31 being retracted in mainly vertical position, minimizing the overall footprint of the aircraft, as detailed in FIG. 18B.

The herein VTOL mode 40 of the third embodiment of invention is obtaining aircraft takeoff, landing and small speed movement (hovering) by creating lift L from the vertical thrust D of the four propulsions systems 52 (FIG. 21A), whose operation is facilitated by the top side slots 33 and bottom side openings 34, and it is obtaining control of the Pitch, Roll and Yaw of the aircraft by independently adjusting the thrust of the said propulsion systems 52A, 52B, 52C and 52D.

The said high-speed flying operation mode 41 of the FlyCar aircraft third embodiment is obtained by maintaining the exit openings 15 of propulsion systems 52 in mainly horizontal direction, such that the generated thrust T is horizontal, creating indirect direct lift L from the high-speed movement V of the aircraft lifting-body 51, as shown in FIG. 19, FIG. 20, FIG. 21B. The said high-speed flying mode 41 is also defined, but not limited to, by the flap 30 being in extended position outside of the body 51 and the flaperons 31 being extended in mainly horizontal position, maximizing the overall footprint of the aircraft and wing-like shape of the aircraft lifting-body 51, as detailed in FIG. 20B (vertical cross-section of left side of the third embodiment).

The herein high-speed flying operation mode 41 of the third embodiment of invention is obtaining high-speed horizontal movement (cruising) by generating velocity V of aircraft from the mainly horizontal thrust T of the four propulsions systems 52 (FIG. 21B), whose operation is enhanced by controlling the up-wash air flow on top-front side of the aircraft body 51 and the downwash flow of the top-end side of the aircraft body 51 by means of slots 33 on top side and bottom side openings 34. The operation mode 41 is obtaining control of the Pitch, Roll and Yaw of the aircraft by independently adjusting the thrust of the said systems 52A, 52B, 52C and 52D, and by independently adjusting the area and the angles of the flap 30 and flaperons 31. It is understood that during high-speed operation mode 41 the control of the aircraft Pitch is critical to optimize the amount of lift L of the aircraft through adjustment of the effective angle of attack a of the said aircraft body 51, similar to the wing pitch control of an airplane.

It is understood and covered by the herein invention that the FlyCar aircraft of third preferred embodiment can transition between the two said main operation modes 40 and 41, with any practical combinations that may be derived by those skilled in the field.

Figure 23A:
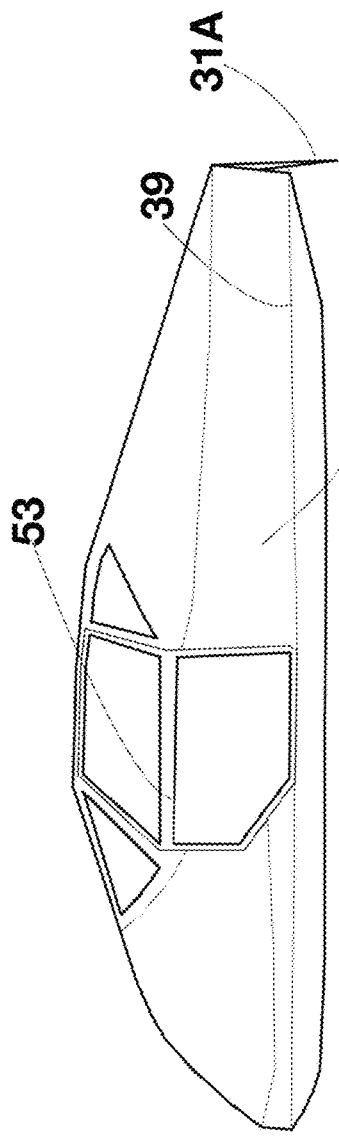
FIG. 23A is the side view of the fourth preferred embodiment of the invention.
Figure 23B:
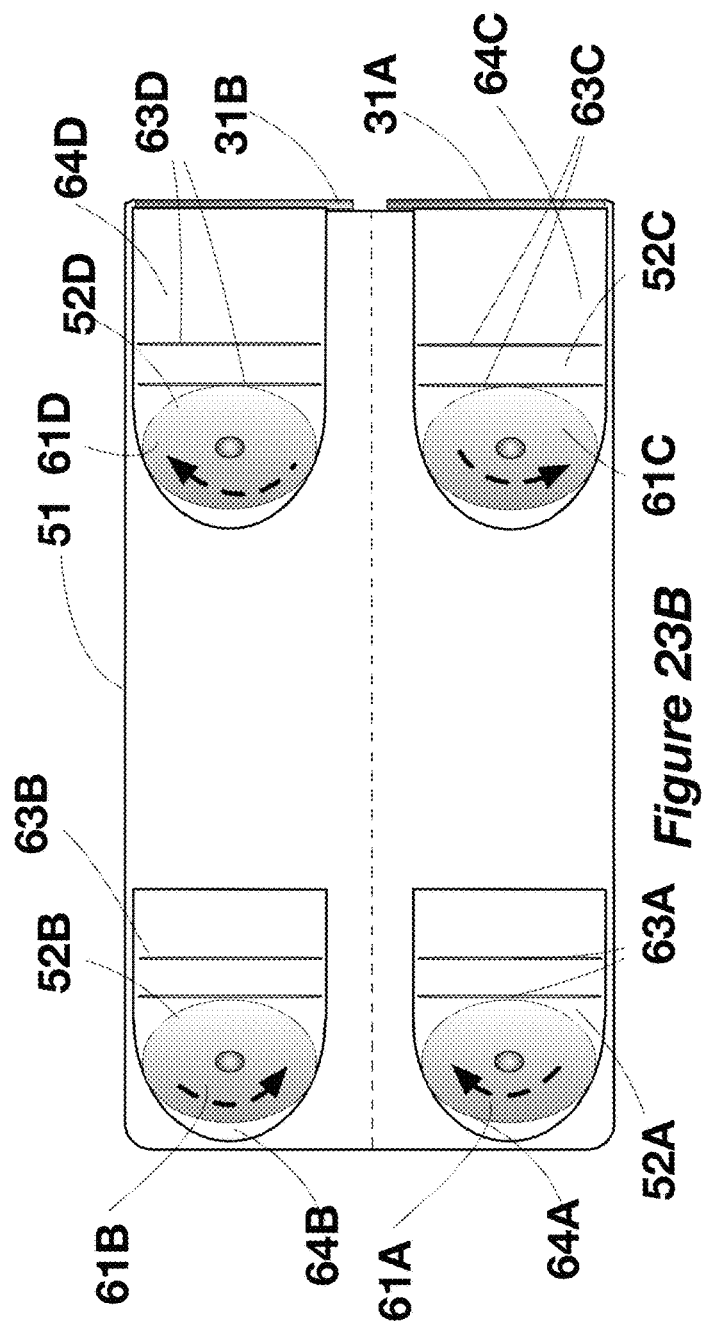
FIG. 23B is a horizontal cross-section of the same fourth embodiment in VTOL mode.
Figure 24A:
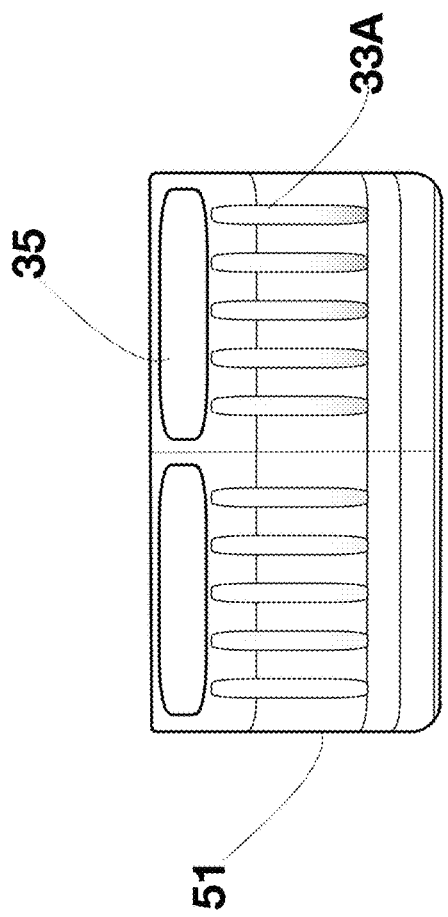
FIG. 24A is the front view of the fourth preferred embodiment of the FlyCar aircraft invention, with FIG. 24B showing a vertical cross-section of the same fourth embodiment of the invention in VTOL mode.
Figure 24B:
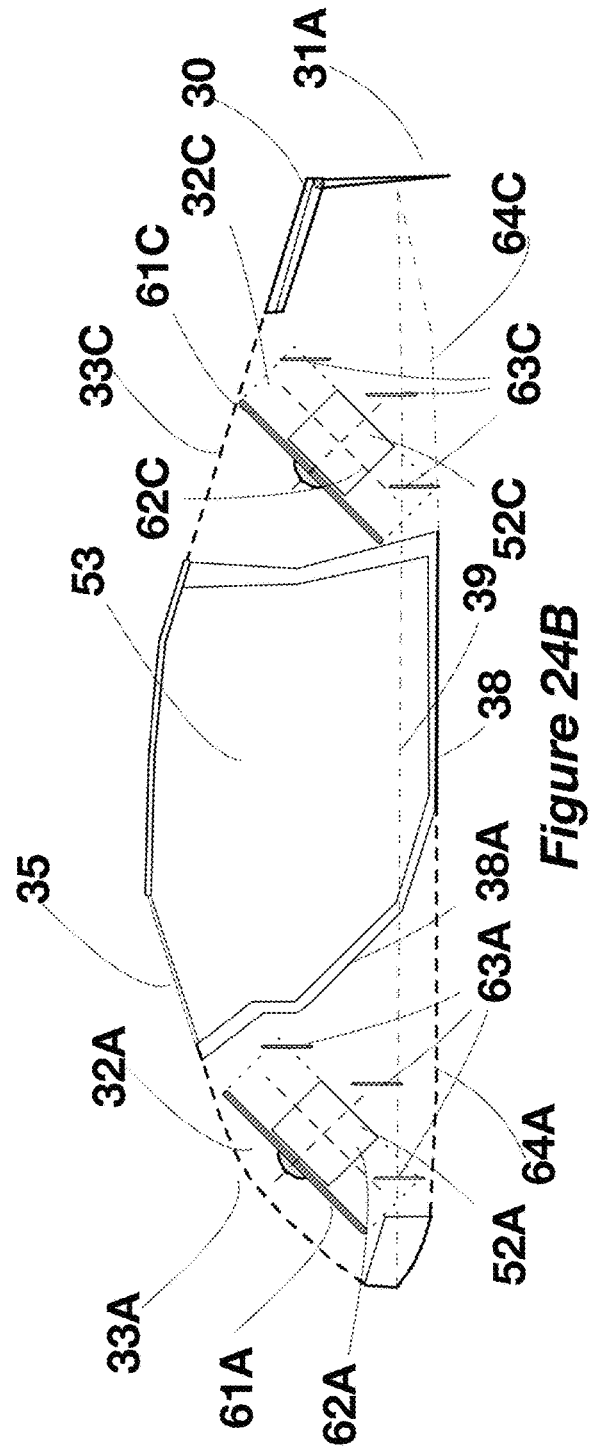

In the fourth preferred embodiment of herein invention, the propulsion systems 52 are each comprised of one propeller 61 connected to one motor 62, as known in prior art, with fix positioning inside cavities 64 at a preferable 45° angle versus the aircraft body, and a series of vanes 63 that can change the thrust direction from vertical to horizontal direction, as described in FIG. 23B, and FIG. 24B.

As depicted in the fourth preferred embodiment of the invention (FIG. 22, FIG. 23, and FIG. 24), a multi-propulsion system 52 is built inside the aircraft lifting-body 51, with a preferable four such independent systems placed in a Front-left 52A, Front-right 52B, Back-left 52C and Back-right 52D configuration (FIG. 23B), in such way that the main cabin 53 in central area of the body 51 is dedicated to the passengers and pay-load.

The herein aircraft body 51 has attached at least one flap 30 and at least two flaperons 31 at the rear side (left flaperon 31A and right flaperon 31B), as show in FIG. 26. The said flap 30 and flaperons 31 can be independently retracted or expanded depending on the flying modes, for the purpose of controlling the total lift surface and the Pitch, Roll and Yaw of the aircraft, as know in prior art.

It is the preferred implementation of the herein fourth embodiment of the invention, but not limited to, that the four propulsion systems 52 comprised of propellers 61, motors 62 and vanes 63 are placed inside of the aircraft body 51 in the cavities 64 of the body (FIG. 23B—horizontal cross-section, and FIG. 24B—vertical cross-section of the left side of body 51), such that 52A system is in front-left cavity 64A and its propeller 61A rotates clock-wise, 52B system is in front-right cavity 64B and its propeller 61B rotates counter clock-wise, 52C system is in back-left cavity 64C and its propeller 61C rotates clock-wise, and 52D system is in back-right cavity 64D and its propeller 61D rotates counter clock-wise (FIG. 23B), and in such way that the main cabin 53 is placed in the central area of the aircraft body 51. It is understood that in a steady-state operation the sum of all angular momentums of propulsion systems 52 can be zero, creating a stable flight.

It is the preferred implementation of the present invention that each of the internal cavities 64 are corresponding to slots in the upper side of the lifting-body 51 and openings for the bottom side of the body 51, such as front-left cavity 64A is facing top side slots 33A and bottom opening 34A, front-right cavity 64B is facing top side slots 33B and bottom opening 34B, back-left cavity 64C is facing top side slots 33C and bottom opening 34C, and back-right cavity 64D is facing top side slots 33D and bottom opening 34D (FIG. 22, FIG. 23 and FIG. 24).

Figure 25A:
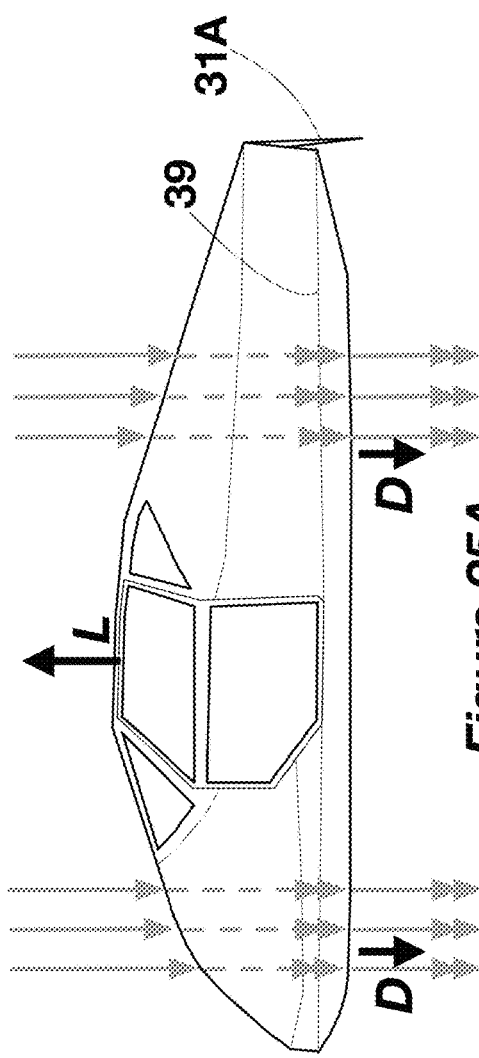
FIG. 25A is the side operational view of the fourth preferred embodiment of the FlyCar invention during VTOL mode, with FIG. 25B showing the side operational view during the high-speed flying mode for the fourth preferred embodiment of the invention.
Figure 25B:
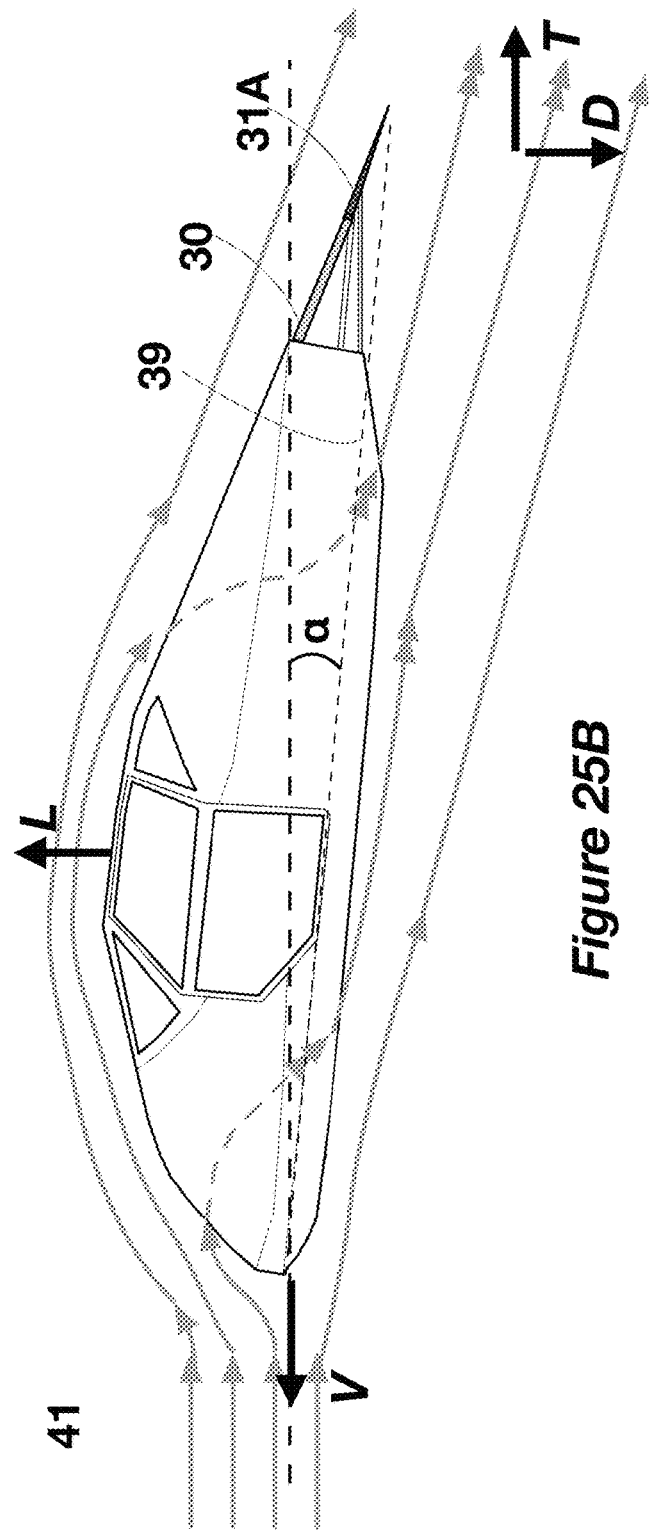
Figure 26A:
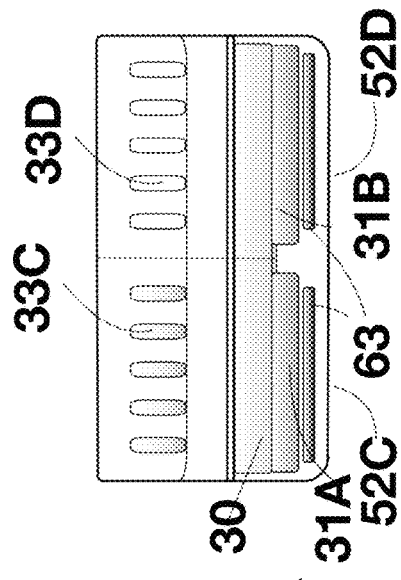
FIGS. 26A, 26B, 26C, and 26D are the side view, top view, back view and front view of the fourth preferred embodiment of the invention in high-speed flying mode.
Figure 26B:
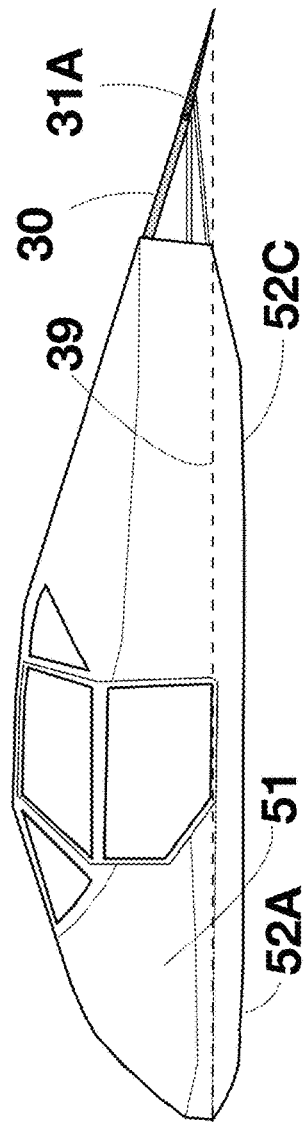
Figure 26C:
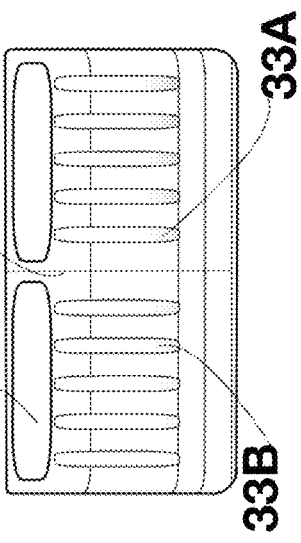
Figure 26D:
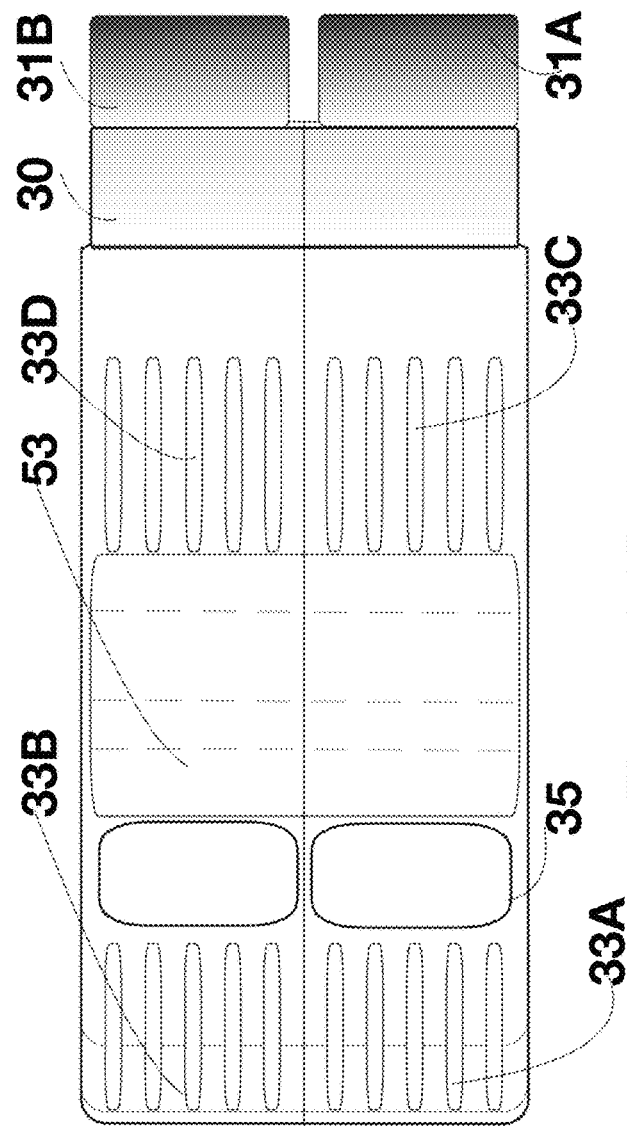
Figure 27A:
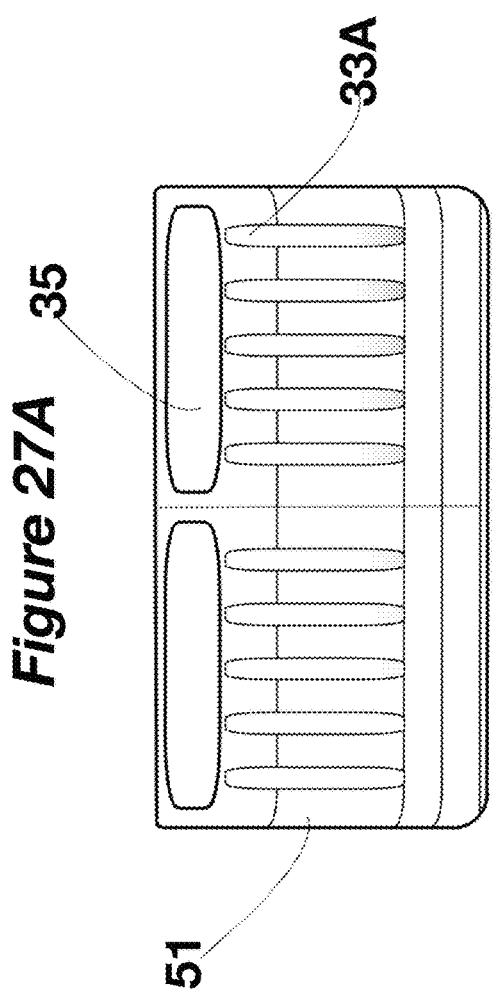
FIG. 27A is the front view of the fourth preferred embodiment of the invention.
Figure 27B:
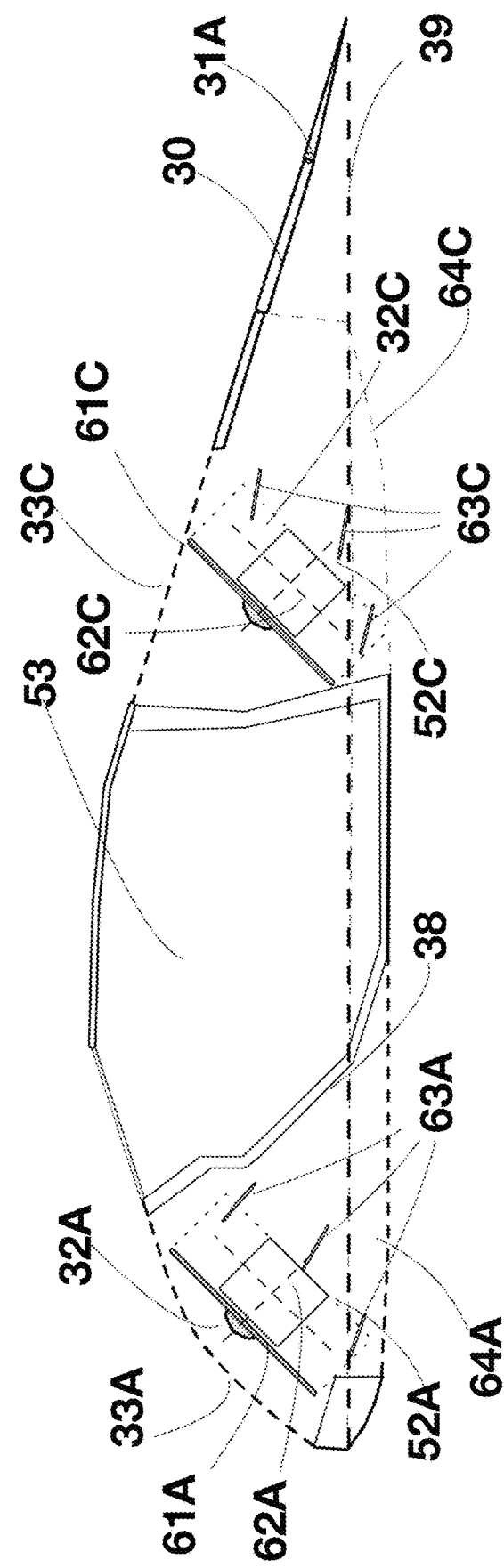
FIG. 27B is a vertical cross-section of the same fourth embodiment in high-speed flying mode.

Furthermore the said cavities 64, top side slots 33 and bottom side openings 34 are having the placement and shape to facilitate both a mainly vertical flow of exhaust air and vertical trust D when the propulsion systems 52 have the vanes 63 in vertical position for VTOL operation mode (FIG. 24B and FIG. 25A) and a mainly horizontal exhaust air flow for horizontal thrust T when the propulsion systems 52 have the vanes 63 tilted in mainly horizontal position for high-speed cruising operation mode (FIG. 25B and FIG. 27B).

It is understood that the main traveling mode of the aircraft is forward-moving; therefore the cabin 53 shape is tailored to a corresponding aerodynamic shape of body 51, being placed in a central area of the said body 51 and corresponding to the highest vertical profile of the aircraft body 51, in order the maximize the pay-load volume capability. The cabin 53 is comprised, but not limited to, by at least one front windshield 35, at least one access door 36, and at least one side-window 37, where the said windshield 35, access door 36 and side-window 37 are part of the aerodynamic lifting-body 51. The herein main cabin 53 is further comprised by a shell 38 that is internal to the body 51, and delimits the cabin area from the propulsion systems 52, where the said shell 38 has such a shape for its front lower side 38A that facilitates a easy non-turbulent air flow when the front systems 34A and 34B are generating trust in the main horizontal direction. Cabin 53 is containing at least passenger seats, control board and storage area, with the ergonomically features covering all the possible variations that may be derived by those skilled in the field.

It is understood that for the subject of the invention the four propulsion systems 52 can be controlled independently in respect of thrust level and that the their vanes 63 control the thrust direction, and that in combination with the deployment of the flap 30 and flaperons 31 can produce two main operation modes for the FlyCar aircraft, VTOL mode 40 (as described in FIG. 22, FIG. 23, FIG. 24 and FIG. 25A) and high-speed cruising mode 41 (as described in FIG. 26, FIG. 27, and FIG. 25B). However the fourth embodiment of herein invention is not limited to these two operation modes, covering any practical combination that may be derived by those skilled in the field.

The said VTOL operation mode 40 is obtained by maintaining the thrust of propulsion systems 52 in vertical direction by means of vanes 63, such that the generated thrust D is mainly vertical, creating direct lift L, as shown in FIG. 23, FIG. 24 and FIG. 25A. The said VTOL operation mode 40 is also defined, but not limited to, by the flap 30 being in retracted position inside of the body 51 and the flaperons 31 being retracted in mainly vertical position, minimizing the overall footprint of the aircraft, as detailed in FIG. 24B.

The herein VTOL mode 40 of the fourth embodiment of invention is obtaining aircraft takeoff, landing and small speed movement (hovering) by creating lift L from the vertical thrust D of the four propulsions systems 52 (FIG. 25A), whose operation is facilitated by the top side slots 33 and bottom side openings 34, and it is obtaining control of the Pitch, Roll and Yaw of the aircraft by independently adjusting the thrust of the said systems 52A, 52B, 52C and 52D and adjusting the position of vanes 63A, 63B, 63C and 63D.

The said high-speed flying operation mode 41 of the FlyCar aircraft fourth embodiment is obtained by maintaining the vanes 63 of propulsion systems 52 in mainly horizontal direction, such that the generated thrust T is horizontal, creating indirect lift L from the high-speed movement V of the aircraft lifting-body 51, as shown in FIG. 25B, FIG. 26, and FIG. 27B. The said high-speed flying mode 41 is also defined, but not limited to, by the flap 30 being in extended position outside of the body 51 and the flaperons 31 being extended in mainly horizontal position, maximizing the overall footprint of the aircraft and wing-like shape of the aircraft lifting-body 51, as detailed in FIG. 27B (vertical cross-section of left side of the fourth embodiment).

The herein high-speed flying operation mode 41 of the fourth embodiment of invention is obtaining high-speed horizontal movement (cruising) by generating velocity V of aircraft from the mainly horizontal thrust T of the four propulsions systems 52 (FIG. 25B), whose operation is enhanced by controlling the up-wash air flow on top-front side of the aircraft body 51 and the downwash flow of the top-end side of the aircraft body 51 by means of slots 33 on top side and bottom side openings 34, reducing the drag force and the air turbulence. The operation mode 41 is obtaining control of the Pitch, Roll and Yaw of the aircraft by independently adjusting the thrust of the said systems 52A, 52B, 52C and 52D, and by independently adjusting the area and the angles of the flap 30 and flaperons 31. It is understood that during high-speed operation mode 41 the control of the aircraft Pitch is critical to optimize the amount of lift L of the aircraft through adjustment of the effective angle of attack a of the said aircraft body 51, similar to the wing pitch control of an airplane (FIG. 25B).

It is understood and covered by the herein invention that the FlyCar aircraft of fourth embodiment can transition between the two said main operation modes 40 and 41, with any practical combinations that may be derived by those skilled in the field.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above descriptions.

What is claimed is:

1. A vehicle capable of a vertical takeoff and a vertical landing, comprising:
    a body configured to house the elements of the vehicle, the body including a front end and a backend, a profile between a maximum height of the body and the front end having at least a first angled surface and a second angled surface, wherein a first angle of the first angled surface is different than a second angle of the second angled surface;
    a first air flow path extending from an upper surface of the body to a lower surface of the body, wherein the first air flow path extends through the body;
    a first propulsion system positioned along the first air flow path within the body;
    a first set of slots configured to control air flowing through the first air flow path, the first set of slots being positioned through the upper surface of the body, the length of each of the first set of slots being longer than a length of the first propulsion system; the first set of slots being positioned at an upward angle from the front end of the body towards the backend of the body and extending across the first angled surface and portions of the second angled surface, wherein a directionality of each of the first sets of slots corresponds to the first angled surface and the second angled surface and is configured to control vertical flow of exhaust air and vertical thrust when the first propulsion system is in a first mode and a horizontal exhaust air flow for horizontal thrust when the first propulsion system is in a second mode;
    a first cavity configured to house the first propulsion system, the first cavity being positioned between the upper surface of the body below the slots and the lower surface of the body, wherein the first propulsion system is configured to rotate its thrust at least ninety degrees around an axle within the cavity, the axle extending along the lateral axis of the vehicle,
    a second air flow path extending from the upper surface of the body to the lower surface of the body, wherein the second air flow path extends through the body, wherein the first air flow path is positioned between a proximal end of the vehicle and a proximal end of a shell, and the second air flow path is positioned between a distal end of the shell and a distal end of the vehicle;
    a second propulsion system positioned along the second air flow path within the body;
    a second set of slots configured to control air flowing through the second air flow path, the second set of slots being positioned through the upper surface of the body, wherein each of the second set of slots is a same length as each of the first set of slots, each of the second set of slots being positioned at a downward angle from the front end of the body towards the backend of the body, wherein the second propulsion system is configured to rotate its thrust at least ninety degrees around an axle while positioned within the cavity, the axle extending along the lateral axis of the vehicle, wherein a rotation of the second propulsion system is contained below the upper surface of the body, and the rotation of the second propulsion system extends beneath a second opening positioned on the lower surface of the body.

2. The vehicle of claim 1, wherein passengers are configured to sit in the shell positioned between the first air flow path and the second air flow path.

3. The vehicle of claim 1, wherein the first flow path includes a first opening positioned on the lower surface of the body.

4. The vehicle of claim 3, wherein the second flow path includes the second opening positioned on the lower surface of the body, wherein a space occupied by the first opening is larger than that occupied by the first set of slots.

5. The vehicle of claim 1, further comprising:
    a retractable hovercraft skirt, wherein the hovercraft skirt is configured to be extended in a first mode, and retracted in a second mode, the retractable hovercraft skirt being configured to be coupled to the lower surface of the body, wherein the first propulsion system is configured to create an air cushion contained by the retractable hovercraft skirt in the first mode, the retractable hovercraft skirt extending from the proximal end of the vehicle to the distal end of the shell and an upper surface of the retractable hovercraft skirt ends before the second air flow path within the body.

6. The vehicle of claim 1, further comprising:
    a flap positioned on the distal end of the vehicle configured to control a total lift surface of the vehicle wherein the flap includes two flaperons that are configured to be independently retracted and expanded.

7. The vehicle of claim 6, wherein the two flaperons are retracted when the vehicle is lifting and taking off, and the two flaperons are extended when the vehicle is moving forward, wherein when the flaperons are extended the flaperons, flap, and the upper surface of the body from the distal end of the shell to a distal end of the flaperons form a linear surface to control a total lift surface, Pitch, Roll and Yaw of the vehicle.

8. A method associated with a vehicle capable of a vertical takeoff and a vertical landing, comprising:
    forming a first air flow path extending from an upper surface of a body to a lower surface of the body, wherein the first air flow path extends through the body, the body including a front end and a backend, a profile between a maximum height of the body and the front end having at least a first angled surface and a second angled surface, wherein a first angle of the first angled surface is different than a second angle of the second angled surface;
    positioning a first propulsion system along the first air flow path within the body;
    flowing air through a first set of slots to control air flowing through the first air flow path, the first set of slots being positioned through the upper surface of the body, the length of each of the first set of slots being longer than a length of the first propulsion system; the first set of slots being positioned at an upward angle from the front end of the body towards the a backend of the body and extending across the first angled surface and portions of the second angled surface, wherein a directionality of each of the first sets of slots corresponds to the first angled surface and the second angled surface is configured to control vertical flow of exhaust air and vertical thrust when the first propulsion system is in a first mode and a horizontal exhaust air flow for horizontal thrust when the first propulsion system is in a second mode;
    forming a second air flow path extending from the upper surface of the body to the lower surface of the body, wherein the second air flow path extends through the body, wherein the first air flow path is positioned between a proximal end of the vehicle and a proximal end of a shell, and the second air flow path is positioned between a distal end of the shell and a distal end of the vehicle;
    positioning a second propulsion system along the second air flow path within the body;
    flowing air through a second set of slots to control air flowing through the second air flow path, the second set of slots being positioned through the upper surface of the body, wherein each of the second set of slots is a same length the first set of slots being and each of the second set of slots is positioned at a downward angle from the front end of the body towards the backend of the body, wherein the second propulsion system is configured to rotate its thrust at least ninety degrees around an axle while positioned within the cavity, the axle extending along the lateral axis of the vehicle, wherein a rotation of the second propulsion system is contained below the upper surface of the body, and the rotation of the second propulsion system extends beneath a second opening positioned on the lower surface of the body.

9. The method of claim 8, wherein the first flow path includes a first opening positioned on the lower surface of the body.

10. The method of claim 9, wherein the second flow path includes the second opening positioned on the lower surface of the body, wherein a space occupied by the first opening is larger than that of the first set of slots.

11. The method of claim 8, further comprising:
    coupling a retractable hovercraft skirt to the lower surface of the body;
    extending the retractable hovercraft skirt in a first mode;
    retracting the retractable hovercraft skirt in a second mode;
    creating an air cushion, via the first propulsion system, contained by the retractable hovercraft skirt in the first mode, wherein passengers are configured to sit in the shell positioned between the first air flow path and the second air flow path, the retractable hovercraft skirt extending from the proximal end of the vehicle to the distal end of the shell and an upper surface of the retractable hovercraft skirt ends before the second air flow path within the body.

12. The method of claim 8, further comprising:
    positioning a flap on the distal end of the vehicle;
    controlling a total lift surface of the vehicle via the flap, wherein the flap includes two flaperons that are configured to be independently retracted and expanded.

13. The method of claim 12, further comprising:
    retracting the two flaperons are retracted when the vehicle is lifting and taking off, and
    extending the two flaperons when the vehicle is moving forward.

* * * * *